US007411870B2

United States Patent
Murata et al.

(10) Patent No.: US 7,411,870 B2
(45) Date of Patent: Aug. 12, 2008

(54) RADIO-WAVE TIMEPIECES AND TIME INFORMATION RECEIVERS

(75) Inventors: Yoshiyuki Murata, Chichibu (JP); Kaoru Someya, Kiyose (JP)

(73) Assignee: Casio Computer Co., Ltd., Tokyo (JP)

( * ) Notice: Subject to any disclaimer, the term of this patent is extended or adjusted under 35 U.S.C. 154(b) by 276 days.

(21) Appl. No.: 11/230,342

(22) Filed: Sep. 20, 2005

(65) Prior Publication Data

US 2006/0067166 A1 Mar. 30, 2006

(30) Foreign Application Priority Data

| | | | |
|---|---|---|---|
| Sep. 30, 2004 | (JP) | .............................. | 2004-288931 |
| Dec. 3, 2004 | (JP) | .............................. | 2004-351256 |
| Dec. 28, 2004 | (JP) | .............................. | 2004-380110 |

(51) Int. Cl.
*G06F 11/08* (2006.01)

(52) U.S. Cl. .......................................... 368/47; 713/400

(58) Field of Classification Search ....................... None
See application file for complete search history.

(56) References Cited

U.S. PATENT DOCUMENTS 6,967,901 B2 11/2005 Shimizu

FOREIGN PATENT DOCUMENTS

| | | |
|---|---|---|
| CN | 1447198 A | 10/2003 |
| JP | 05-142363 | 6/1993 |
| JP | 05-157859 | 6/1993 |
| JP | 07-198878 | 8/1995 |
| JP | 2000-235093 A | 8/2000 |

*Primary Examiner*—Renee S Luebke
(74) *Attorney, Agent, or Firm*—Frishauf, Holtz, Goodman & Chick, P.C.

(57) ABSTRACT

When lack of a part data on a time code included in a received standard radio wave is detected, the lack is filled up with a corresponding data part of another time code. The time of a radio-wave timepiece is corrected in accordance with the time code whose lack has been filled up.

5 Claims, 31 Drawing Sheets

FIG.12A

| | | |
|---|---|---|
| 51a | PREVIOUS RECEPTION START DATE | 9/26/2004 00:00:00 |
| 51b | RECEPTION START DATE | 10/04/2004 00:00:00 |

FIG.12B

| | | |
|---|---|---|
| 51a | PREVIOUS RECEPTION START DATE | 10/04/2004 00:00:00 |
| 51b | RECEPTION START DATE | 10/14/2004 16:00:00 |

FIG.16A SIGNAL a
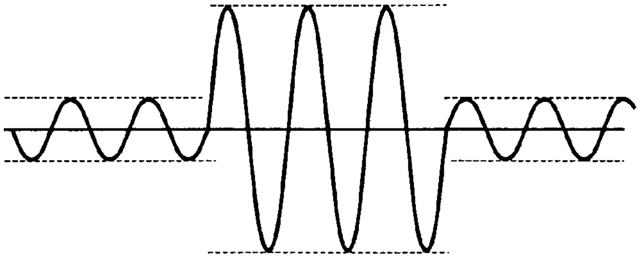
FIG.16B SIGNAL b
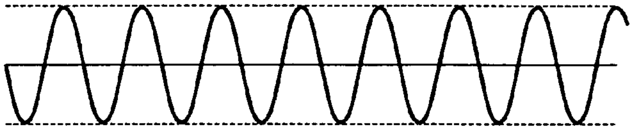
FIG.16C SIGNAL c1
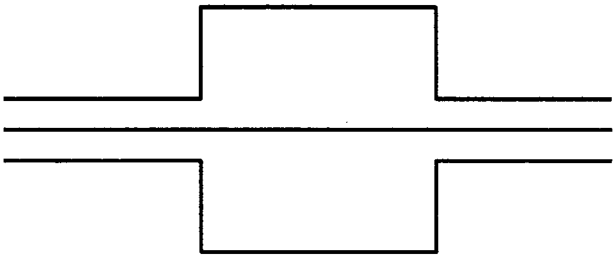
FIG.16D SIGNAL d
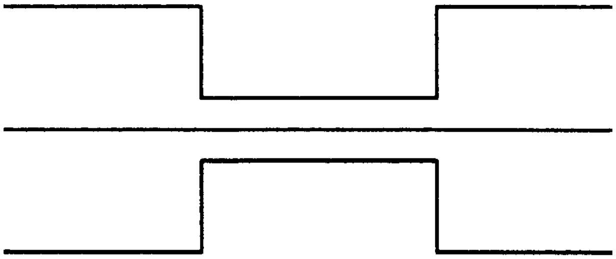
FIG.16E SIGNAL e
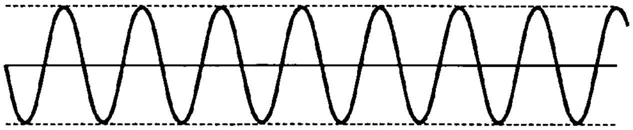

FIG.21

43 (columns 43a, 43b, 43c)

| EXECUTION DAY | TO-BE-CORRECTED OBJECT DATA | ACQUIRE LOCATION (-TH TO -TH SECOND) |
|---|---|---|
| EVERY SUNDAY | MINUTE DATA | 1-9 |
| APR. 1, OCT. 1 EVERY YEAR | O'CLOCK DATA | 12-19 |
| MAY. 1, SEPT. 1 EVERY YEAR | DAY OF THE YEAR DATA | 22-33 |
| JAN. 1 EVERY YEAR | YEAR DATA | 41-49 |
| 15TH EVERY MONTH | DAY AT THE WEEK DATA | 50-52 |

FIG.22

53 (columns 53a, 53b, 53c)

| EXECUTION DAY | TO-BE-CORRECTED DATA | ACQUIRE LOCATION (-TH THROUGH -TH SECOND) |
|---|---|---|
| APR. 1 2:00 A.M. | O'CLOCK DATA | 12-19 |

FIG.25

45

| EXECUTION DAY (45a) | TO-BE-CORRECTED DATA (45b) | ACQUIRE LOCATION (-TH SECOND) (45c) | P SIGNAL | |
|---|---|---|---|---|
| | | | START COUNT (45d) | END COUNT (45e) |
| EVERY SUNDAY | MINUTE DATA | 1-9 | 0 | 1 |
| APR. 1, OCT. 1 EVERY YEAR | O'CLOCK DATA | 12-19 | 1 | 2 |
| MAY. 1, SEPT. 1 EVERY YEAR | DAY OF THE YEAR DATA | 22-33 | 2 | 4 |
| JAN. 1 EVERY YEAR | YEAR DATA | 41-49 | 4 | 5 |

FIG.26

54

| EXECUTION DAY (54a) | TO-BE-CORRECTED DATA (54b) | ACQUIRE LOCATION (-TH SECOND) (54c) | P SIGNAL | |
|---|---|---|---|---|
| | | | START COUNT (54d) | END COUNT (54e) |
| MAR. 1 2:00 A.M. | DAY OF THE YEAR DATA | 22-33 | 2 | 4 |

43 55 56

| EXECUTION DAY | TO-BE-CORRECTED DATA | ACQUIRE LOCATION (-TH TO -TH SECOND) |
|---|---|---|
| EVERY DAY | MINUTE UNIT DIGIT DATA | 5-9 |
| EVERY SUNDAY | MINUTE DATA | 1-9 |
| 1ST EVERY MONTH | O'CLOCK UNIT DIGIT DATA | 15-19 |
| JAN. 1, JUL. 1 EVERY YEAR | O'CLOCK DATA | 10-19 |
| JAN. 1, JUL. 1 EVERY YEAR | DAY OF THE YEAR DATA | 22-33 |
| JAN. 1 EVERY YEAR | YEAR UNIT DIGIT DATA | 45-49 |
| JAN. 1 EVERY YEAR | YEAR DATA | 41-49 |
| 1ST EVERY MONTH | DAY OF THE WEEK DATA | 49-52 |

RADIO-WAVE TIMEPIECES AND TIME INFORMATION RECEIVERS

CROSS-REFERENCE TO RELATED APPLICATIONS

This application is based upon and claims the benefit of priority from the prior Japanese Patent Applications Nos. 2004-288931, 2004-351256, and 2004-380110, filed on September, 30, December, 3, and December, 12, respectively, 2004, entire contents of which are incorporated herein by reference.

BACKGROUND OF THE INVENTION

1. Field of the Invention

The present invention relates to radio-wave receivers, radio-wave timepieces, and radio-wave reception integrated circuits.

2. Background Art

At present, standard radio waves including time codes are available in many countries including Germany, Great Britain, Switzerland and Japan in the world. In Japan, long-wave standard radio waves of 40 and 60 kHz amplitude-modulated with time code formats transmitted by two transmission stations installed in Fukushima and Saga prefectures are available. Each time a unit digit of a number indicative of minutes of correct time is updated, or at intervals of one minute, a time code of the radio wave is sent out in the form of a frame of 60 seconds.

At present, radio-wave timepieces are commercially available which receive the standard radio waves and correct the time that they count (hereinafter referred often to as "internal time" of the timepieces) (see TOKKAIHEIS 7-198878, 5-157859 and -142363 publications).

Generally, the radio-wave timepieces receive the standard radio waves at a predetermined time, for example at 2 o'clock, once per day. The reason for this is that time correction made substantially once per day suffices for accurate timekeeping in terms of an error involving the time counting and a time interval at which the time correction is performed. Reception of the radio waves at all times for time correction would increase power consumed in the radio-wave reception circuits of the timepieces.

However, with a radio-wave timepiece of the wristwatch type, power consumption is a problem that directly involves the continuously operable time of the wristwatch. Thus, even more reduction of the power consumption is required. To this end, various techniques are invented in which the operating time of the radio-wave reception circuit is minimized as much as possible. For example, an invention is known in which correction of the whole internal time by receiving the whole time code involving one frame included in the standard radio wave and correction of the "second" part of the internal time by using a signal called an M signal appearing when the time code is switched are selectively employed as requested (see TOKKAI 2000-235093 publication).

At least 60 seconds are required for receiving the whole time code. Actually, reception of the radio wave must continue for more than 120 seconds because a time required for the receiving operation of the radio wave reception circuit to be stabilized and a margin time required for receiving a time code for at least one frame should be considered. When the M signal described in TOKKAI 2000-235093 publication is received, the standard radio wave must be received continuously until the M signal is received and if the time required for the receiving operation of the radio wave reception circuit to be stabilized is considered, the reception of the radio wave must continue for a time corresponding to at least one frame. Thus, the time for receiving the standard radio wave is still large.

It is an object of the present invention to provide radio-wave receivers, radio-wave timepieces and time reception apparatus in which reduced time and hence power consumption are required for reception of the standard radio wave for use in time correction.

SUMMARY OF THE INVENTION

In one aspect, part of a transmitted standard radio wave that includes time data modulated in units of a frame is received. Then, a particular one of a plurality of items of identification data disposed at predetermined intervals of time in the frame is detected. Time being counted is then corrected based on a time when the particular one of identification data was detected.

In another aspect, a standard radio wave carrying a standard time code having a normalized standard time format is received. Time counted is corrected by applying a quantity of time correction to the counted time in accordance with the time code of the received radio wave such that the counted time coincides with the time of the received radio wave. An expected date when an error involving the time counted becomes a predetermined error limit time is then calculated based on the time when the time counted was corrected and the correction time applied to the counted time. Responsive to the time counted arriving at the expected date, the standard radio wave is received and the time counted is then corrected in accordance with a time code of the received standard radio wave.

In a further aspect, a standard radio wave is received and a time code is then acquired from the radio wave. Possible lack of o'clock and minute data included in the acquired time code is then detected. Responsive to detection of the lack of o'clock and minute data, the standard radio wave is received again, thereby acquiring a new time code from the radio wave. The lack of o'clock and minute data is filled up based on the first-mentioned and new time codes acquired. The time being counted is then corrected with the time code whose lack of o'clock and minute data was filled up.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 12A and 12B illustrate radio-wave reception start date data stored in a RAM;

FIGS. 16A-16E schematically illustrates wave forms of signals generated in the radio-wave generation circuit;

FIG. 21 illustrates a first to-be-corrected object table;

FIG. 22 illustrates the structure of first correct object reception command data;

FIG. 25 shows a second to-be-corrected object table;

FIG. 26 illustrates the structure of second to-be-corrected object reception command data.

DETAILED DESCRIPTION OF THE INVENTION

Figure 1:
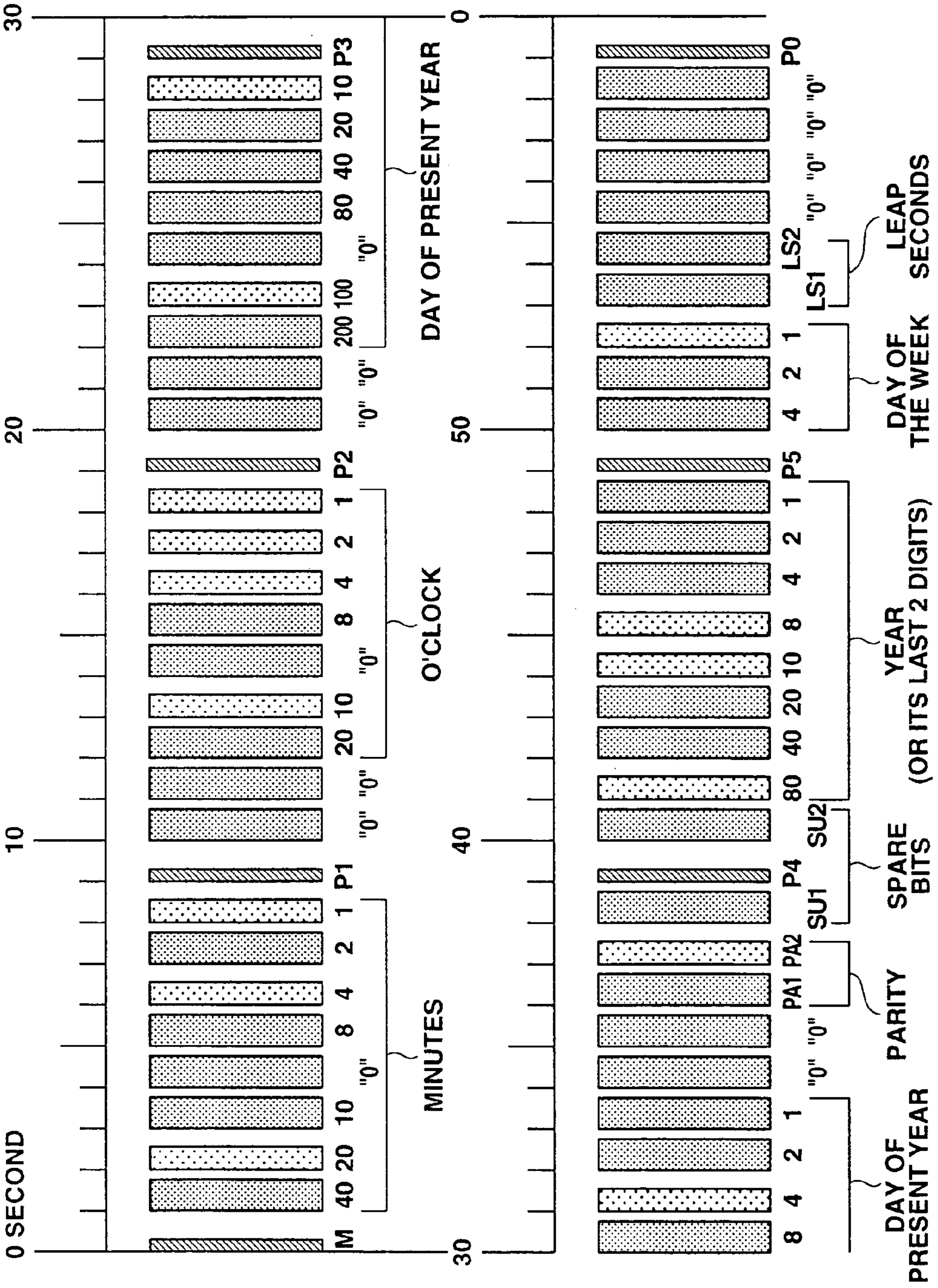
FIG. 1 illustrates a time code format of a standard radio wave used in Japan.

Like reference numerals are used to denote like parts of the drawings showing several embodiments and modifications. Thus, when an element of one embodiment or modification is described, further description of a like element of another embodiment or modification will be omitted. Note that the latter element performs a similar function to that performed by the former element.

First, a time code indicative of time information generated from the standard radio wave will be described. The time code has a format shown in FIG. 1 and is generated as a frame at a cycle of 60 seconds. In the format, an M signal pulse that is a head marker of a pulse width of 0.2 seconds is created at a start point of the frame. In addition, 6 P signals P1, P2, P3, P4, P5 and P0 each having a pulse width of 0.2 seconds are generated at time intervals of 10 seconds; that is, in 9th, 19th, 29th, 39th, 49th and 59th second locations after the start point of time.

One second after this frame, a next M signal pulse of a 0.2 second width appears at the start point of a next frame. That is, when two pulses of a 0.2 second width appear successively, a frame boundary is recognized therebetween and the position of the latter signal, or M signal, indicates an accurate update time of the minute unit digit of the present frame. In the frame, minute, o'clock, day of the calendar year in AD (counted from January, 1), lower two ones of digits indicative of the year, and day of the week data involving the time when the frame starts are arranged in a BCD notation in 1st-8th, 12th-18th, 22th-33th, 40th-48th and 50th-52nd second locations, respectively. In this case, logics 1 and 0 are represented by pulses of 0.5 and 0.8 second widths, respectively. The frame of FIG. 1 illustrates data on 114th day of the year, 17:25.

The features of the time code format are shown in FIG. 1. As shown in FIG. 1, the P signals are disposed at intervals of 10 seconds. Thus, when the time is corrected using the standard radio wave, the time can be corrected at high speed by using a (9th "second") P1 signal if the error is within ±5 seconds. The M signal is disposed only in a 0th second location, representing the start time of a correct minute. Thus, when the time is corrected in accordance with the standard radio wave, the time can be corrected at high speed using the M signal if the error involving the time being counted is within ±30 seconds.

As described above, by using the features of the time code in combination, the time being counted can be corrected at high speed without receiving the whole time code of one frame. An error involving the time being counted by a time counter provided within a general timepiece is approximately ±15 seconds per month. Thus, even when the radio wave timepiece receives the standard radio wave once per week, the error involving the counted time falls usually within ±5 seconds. Thus, in the present embodiment, high speed time correction by paying attention to the P signal will be described.

First Embodiment

A Radio-Wave timepiece of a Radio Wave Receiver according to the present invention will be described with reference to the drawings.

The first embodiment of the present invention is directed to correction of a "second" part of the internal time being counted by a time counter with a particular one of the P signals included in a received standard radio wave.

<1. Structure>

Figure 2:
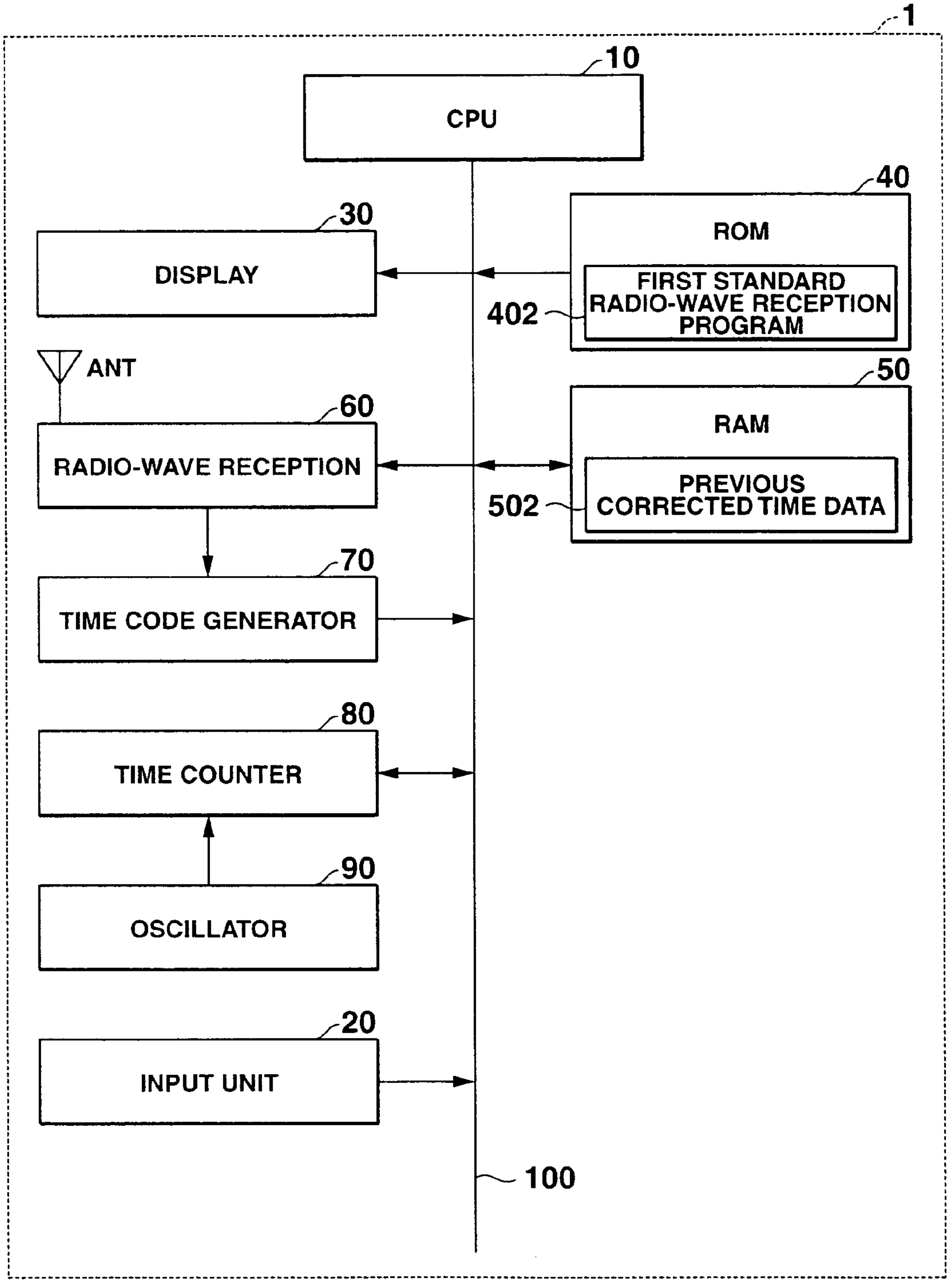
FIG. 2 illustrates the composition of a radio-wave timepiece according to a first embodiment of the invention.

FIG. 2 is a block diagram of a radio-wave timepiece 1 of the present embodiment. Timepiece 1 comprises a CPU 10, an input unit 20, a display 30, a ROM 40, a RAM 50, a radio-wave reception circuit 60, a time code generator 70, an oscillator 90, a time counter 80 that counts clock pulses generated by oscillator 90 to provide data on the present time, and a bus 100 that electrically connects these elements.

Input unit 20 comprises switches to give commands to perform the respective functions of the timepiece. When a user depresses the respective switches, they output corresponding command signals to CPU 10.

Display 30 comprises, for example, an LCD or a segmented display that digitally displays the present date based on display data from CPU 10.

ROM 40 has mainly stored a system program involving the radio wave timepiece and application programs including, especially, a first standard radio wave reception program 402.

RAM 50 temporarily stores various programs to be executed by CPU 10 and data involving the execution of these programs. In the embodiment, the previous internal time corrected based on the received standard radio wave is stored as previous corrected time data 502. For example, the internal time of radio-wave timepiece 1 is corrected or initialized by receiving the whole time code for one frame at least once, and this corrected internal time is then stored as previous corrected time data 502.

CPU 10 reads the respective programs stored in ROM 40 at predetermined times or in response to corresponding operational signals received from input unit 20, loads them on RAM 50, and then gives commands and transfers data concerned to the respective functional elements of the timepiece based on the programs. For example, CPU 10 controls radio-wave reception circuit 60 to receive the standard radio wave. CPU 10 also corrects time data that represents the internal time being counted by time counter 80 based on a time record received from time code generator 70 and then updates a displayed present date based on the corrected time data.

CPU 10 executes a first standard radio-wave reception process (see FIG. 3) in accordance with a corresponding program 402 stored in ROM 20. More specifically, CPU 10 calculates an error comprising the difference between the previous corrected time and the present internal time multiplied by a maximum error per unit-time that can occur in the time counter 80 and is obtained from the time-counting accuracy of the time counter 80. In addition, CPU 10 detects a P signal from the received standard radio wave and then corrects the "second" part of the internal time when the P signal was detected.

Radio-wave receiver 60 extracts only a signal of desired frequency components from the signals received by antenna ANT, detects this signal, and then outputs it to time code generator 70. In this case, a time lag extending from the start of the reception of the radio wave to generation of a time code is greatly reduced by performing a high-speed AGC operation based on TOKKAIS 2004-242157 and -179948 publications.

Time code generator 70 detects time information based on the signal outputted from radio-wave reception circuit 60, generates a time code as required and then outputs it to CPU 10.

Time counter 80 counts clock pulses outputted from oscillator 90, thereby obtaining present-time data representing the internal time of radio-wave timepiece 1, and then outputs it to CPU 10. Oscillator 90 comprises a crystal oscillator that provides clock pulses of a fixed frequency at all times to time counter 80.

<1.2 Operation>

Figure 3:
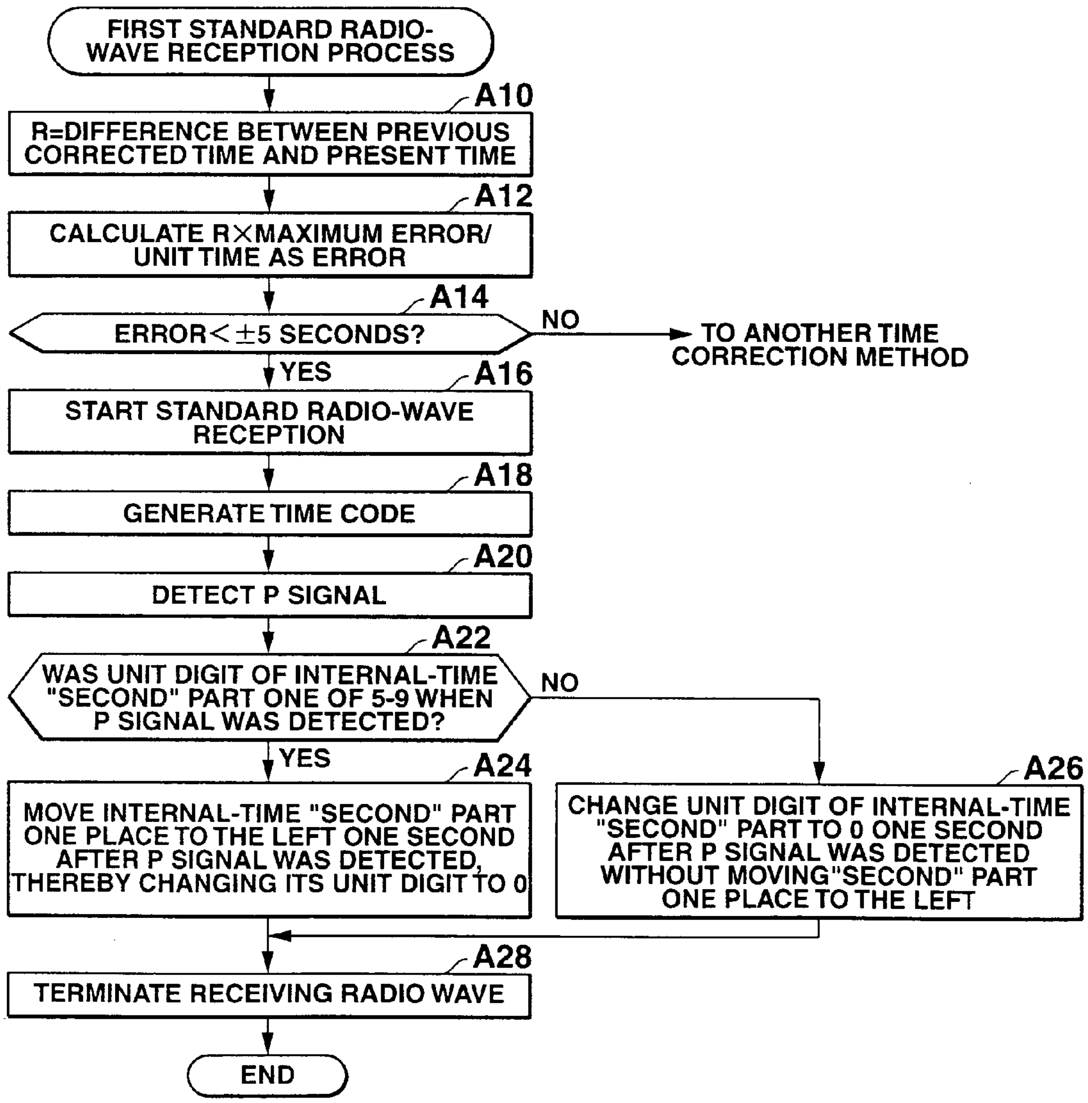
FIG. 3 is a flowchart of a first standard radio-wave reception process to be performed in the first embodiment.

A first standard radio-wave reception process will be described with reference to a flowchart of FIG. 3. This process is performed when CPU 10 executes first standard radio-wave reception program 402 stored in ROM 40, as described above.

First, CPU 10 calculates a difference R between a previous corrected time 502 stored in RAM 50 and the present time counted by time counter 80 (step A10). Then, CPU 10 multiplies the maximum error per unit time by R calculated in step A10, thereby calculating an error involving the time counted by time counter 80 (step A12) The maximum error per unit time comprises an error per unit time obtained based on the time counting accuracy of time counter 80. That is, it is an error occurring in time counter 80 per unit time (for example, of 1 second), or an error per second to which the error of ±15 seconds per month occurring in the internal time is reduced.

Then, CPU 10 determines whether the error calculated in step A12 is within ±5 seconds (step A14). If not (No in step A14), CPU 10 performs another time correction method which comprises correcting the time being counted based on time information on received frames 1-3, as performed in the past.

On the other hand, when the error calculated in step A12 is within ±5 seconds (Yes in step A14), CPU 10 causes radio-wave reception circuit 60 to start to receive the standard radio wave (step A16). A signal indicative of the received standard radio wave is outputted to time code generator 70 as required. Circuit 70 generates a time code from the received signal as required and then outputs it to CPU 10 (step A18). Then, CPU 10 detects an earlier appearing one of P signals included in the time code received from circuit 70 (step A20).

If the unit digit of the "second" part of the internal time is any one of "5"-"9" when the P signal is detected (Yes in step A22), the unit digit of the "second" part of the internal time is changed to 0 (seconds) by moving a figure indicative of the "second" part of the internal time one place to the left one second after the P signal was detected (step A24). When the internal time is 5 seconds slow compared with the time of the standard radio wave, the internal time is corrected by setting the internal time forward.

On the other hand, the unit digit of the "second" part of the internal time is any one of 0-4 when the P signal is detected, or when the internal time is less than 5 seconds fast compared with the received standard time (No in step A22), the unit digit is changed to 0 (seconds) without moving the figure indicative of the "second" part of the internal time one place to the left one second after the P signal was detected (step A26). That is, when the internal time is less than 5 seconds fast compared with the time of the received standard radio wave, the internal time is corrected by being set back.

Then, CPU 10 causes radio-wave reception circuit 60 to terminate reception of the standard radio waves (step A28).

More specifically, when the calculated error is between 0 and −5 seconds, and for example, when the time counter 80 has counted, for example, "16 seconds" as the internal time at a time when a P signal (for example, represented by a pulse P2 of FIG. 1) was detected (or in a "19th second" location in the standard radio wave) (Yes in step A22), CPU 10 corrects the "second" part of the internal time to "20" (seconds) by moving its figure one place to the left one second after the P signal was detected (step A24). When the calculated error is between 0 and +5 seconds, or when the time counter 80 has counted, for example, "22" seconds as the internal time of the time counter 80 at a time when a P signal (represented, for example, by pulse P2 of FIG. 1) was detected (No in step A22), CPU 10 corrects the "second" part of the internal time to "20" seconds one second after the P signal was detected without moving the figure indicative of the "second" part of the internal time one place to the left (step A26).

<1.3 Advantages>

As described above, according to the first embodiment, when it is assumed that the error involving the time being counted by the time counter 80 is within ±5 seconds compared with the time represented by the standard radio wave, a P signal can be detected from the received standard radio wave, and the time being counted by the time counter 80 can be corrected at the unit digit of the "second" part when the P signal was detected. Thus, when the time is corrected, the whole time code of one frame need not to be received, and time correction is achieved in a reduced time compared with the prior art in which the time correction is performed by receiving the whole time code of one frame.

Second Embodiment

<2.1 Structure>

Figure 4:
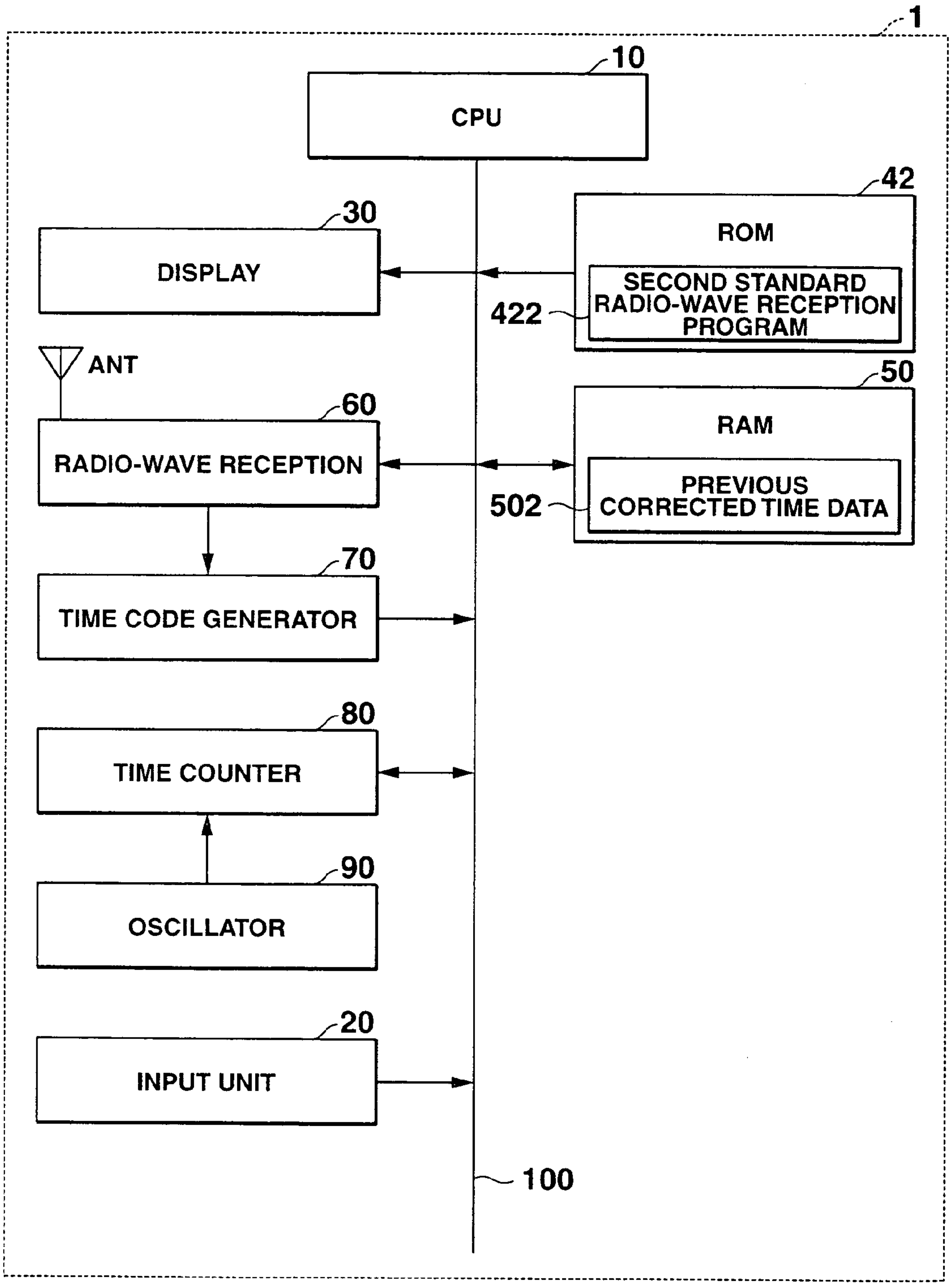
FIG. 4 illustrates the composition of a radio-wave timepiece according to a second embodiment of the invention.

A radio-wave timepiece of the present embodiment is obtained by replacing ROM 40 of FIG. 2 of the first embodiment by ROM 42 of FIG. 4.

Referring to FIG. 4, ROM 42 has stored a second standard radio-wave reception program 422. When a user gives a command to receive the standard radio-wave and then correct the time of the timepiece, CPU 10 executes program 422, thereby performing a corresponding second standard radio-wave reception process. When in this process CPU 10 determines that an "o'clock" part of a time code of the received standard radio-wave coincides with that of the internal time of the timepiece, CPU 10 then detects a next appearing P signal and one second after this detection, sets the "second" part of the internal time to 20.00 seconds.

<2.2 Operation>

Figure 5:
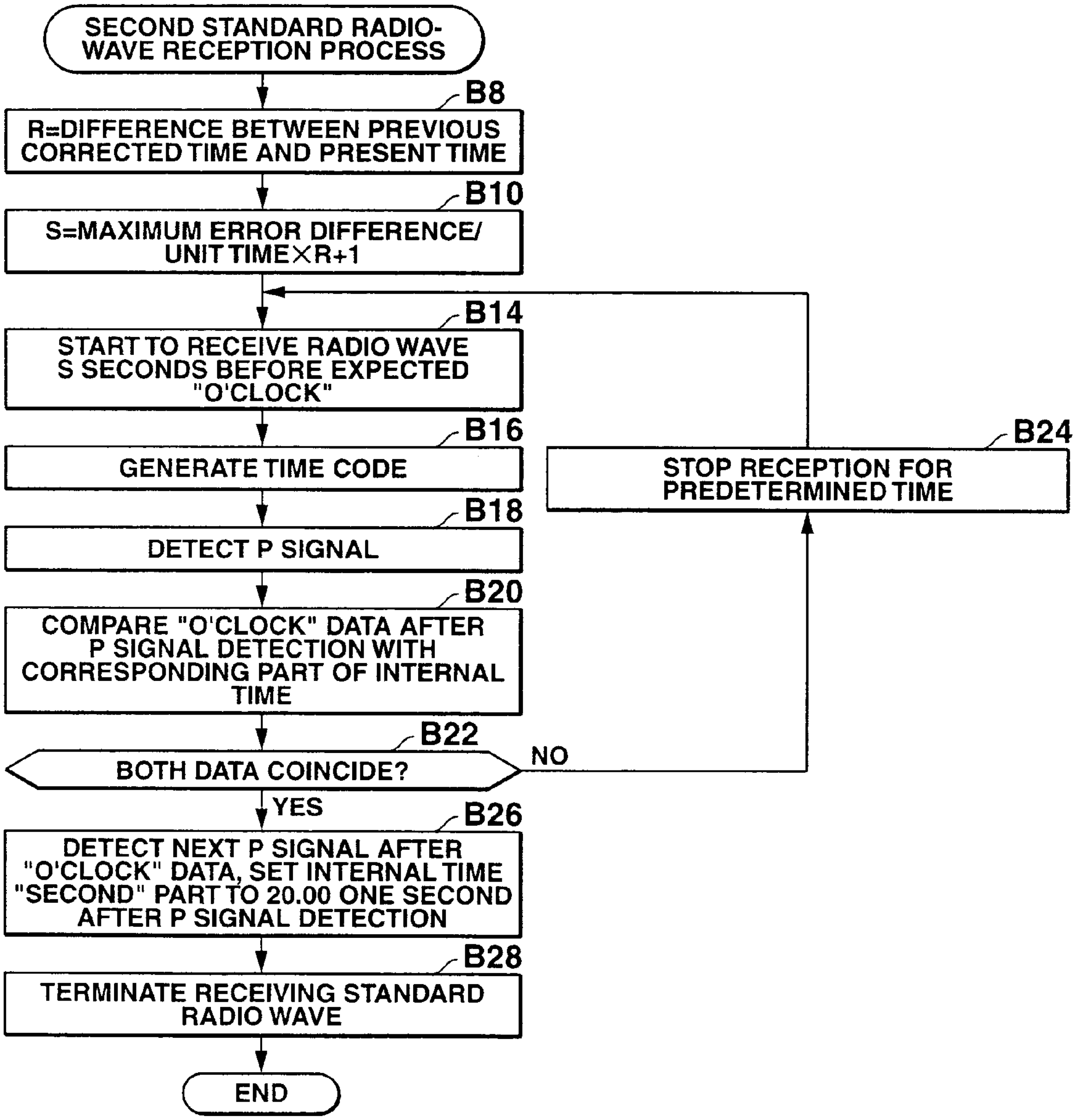
FIG. 5 is a flowchart of a second standard radio-wave reception process to be performed in the second embodiment.

Then, the second standard radio-wave reception process will be described with respect to a flowchart of FIG. 5. This process is performed when CPU 10 executes second standard radio-wave reception program 422 in ROM 42.

First, CPU 10 calculates a difference R between previous corrected time 502 stored in ROM 42 and the present time counted by time counter 80 (step B8). Then, CPU 10 multiplies the maximum error per unit time by R calculated in step B10, and then adds a margin (of, for example, "1") for the maximum error per unit time to a resulting value of the multiplication, thereby providing a result S (step B10).

Then, CPU 10 causes radio-wave reception circuit 60 to receive the standard radio-wave S seconds before a time indicating "o'clock" data of a time code of the standard radio-wave (step B14). A signal indicative of the received standard radio-wave is then outputted to time code generator 70 as required. This generator 70 then generates a time code in accordance with the received signal and outputs it to CPU 10 (step B16). Then, CPU 10 detects a P (more particularly, P1) signal included in the time code produced by time code generator 70 (step B18).

Then, CPU 10 compares the "o'clock" part of the time code following the P signal detected in step B18 with that of the internal time of the timepiece counted by the time counter 80 to determine whether both the o'clock parts coincide (step B20). When CPU 10 determines that they do not coincide (No in step B22); CPU 10 causes radio-wave reception circuit 60 to stop reception of the standard radio-wave for a predetermined time and then repeats steps B14-B22. The predetermined time refers to a time for which CPU 10 must again wait for reception of next "o'clock" data, and for example, 50 seconds after which next "o'clock" data of the time code will appear again.

When CPU 10 determines that both the "o'clock" data coincide in step B20 (Yes in step B22), CPU 10 detects a P signal following the "o'clock" data of the generated time code, and then one second later, sets the "second" part of the internal time to 20.00 seconds (step B26). CPU 10 then causes radio-wave reception circuit 60 to terminate reception of the standard radio wave (step B28).

Figure 6:
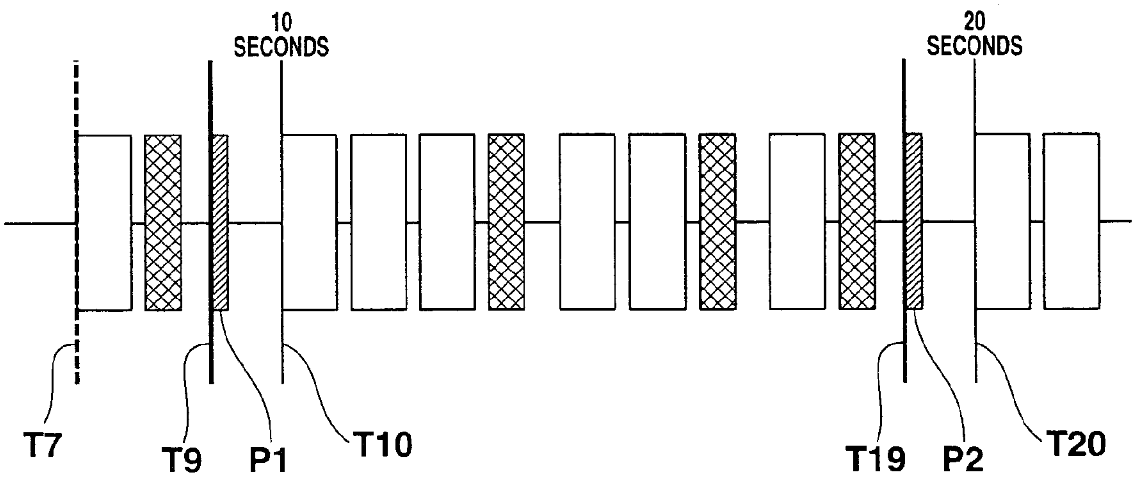
FIG. 6 illustrates the features of a time code format.

More particularly, FIG. 6 illustrates a part of the time code in which the second standard radio-wave reception process is performed between "15" and "16" (o'clock) of the internal time. CPU 10 causes radio-wave reception circuit 60 to start to receive the standard radio-wave at a time T7 which is S seconds before a time T10 when the expected "o'clock" starts. AP (more particularly, P1) signal is detected at a time T9, at which time CPU 10 reads "o'clock" data from a time code part following the P signal. The "o'clock" data included in the time code is "15", which coincides with that indicating the "o'clock" of the internal time. Thus, CPU 10 waits detection of a next P signal. When CPU 10 detects the next P (more particularly, P2) signal at a time T19, CPU 10 sets a "second" part of the internal time to "20.00" seconds at a time T20 one second after detection of P2 signal.

<2.3 Advantages>

As described above, according to the second embodiment, the "second" part of the internal time can be corrected when the "o'clock" data included in the time code of the standard radio-wave coincides with that of the internal time counted by time counter 80. Since an error involving the internal time of a general time counter is approximately ±15 seconds per month, an error that will be produced even when the internal time is not corrected for one week will fall within ±5 seconds. Thus, the "o'clock" data included in the time code of the standard radio-wave coincides with that of the internal time of the timepiece, excluding under special conditions, and hence the time can be corrected efficiently with single reception of the standard radio-wave without greatly consuming power.

<2.4 Modification>

While in the embodiment the second standard radio-wave reception process is started in accordance with the user's command operation, thereby correcting the internal time of the timepiece, the second standard radio-wave reception process may be executed at a predetermined time, of course. More specifically, when the internal time arrives, for example, at 2.00 a.m., CPU 10 may execute the second standard radio-wave reception process automatically. In this case, in step B20, CPU 10 is required to determine whether the "o'clock" data of the time code coincides with "2 o'clock" of the standard radio wave being received automatically. In accordance with such arrangement, the internal time of the timepiece is corrected automatically every day and an error involving the internal time is reduced to a small one. Thus, the time required for receiving the standard radio-wave can be further reduced.

While in the second embodiment the "o'clock" data of the time code following the P signal is illustrated as compared with the "o'clock" part of the internal time counted by time counter 80, a "minute" part of the time code preceding the P signal may be compared with that of the internal time counted by time counter 80.

Third Embodiment

<3.1 Structure>

Figure 7:
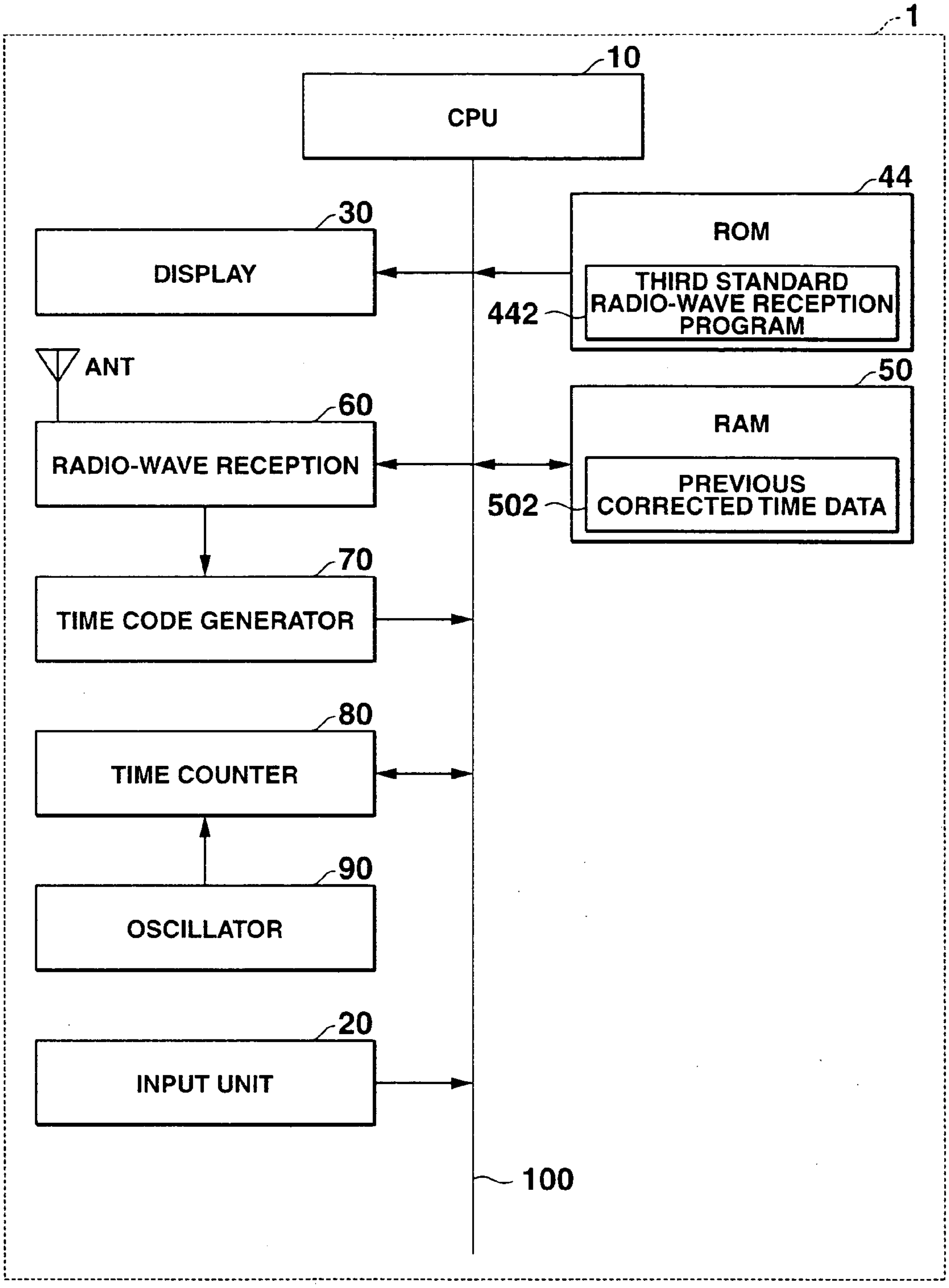
FIG. 7 illustrates the composition of a radio-wave timepiece according to a third embodiment of the invention.

A radio-wave timepiece of the third embodiment is obtained by replacing ROM 40 of FIG. 2 in the first embodiment by a ROM 44 of FIG. 7.

Referring to FIG. 7, ROM 44 has stored a third standard radio-wave reception program 442 to be executed by CPU 10 in the present embodiment, thereby performing a corresponding process. More specifically, when the unit digit of the "second" part of the internal time becomes 9, CPU 10 saves this digit as "9:00". When radio-wave reception circuit 60 starts to receive the standard radio-wave and CPU 10 detects a rising edge of a P signal pulse, CPU 10 releases saving "9.00", thereby restarting the time counting and correcting the internal time.

Time counter 80 of the third embodiment should be preset so as to have a fast error necessarily compared with the time of the received standard radio-wave.

<3.2 Operation>

Figure 8:
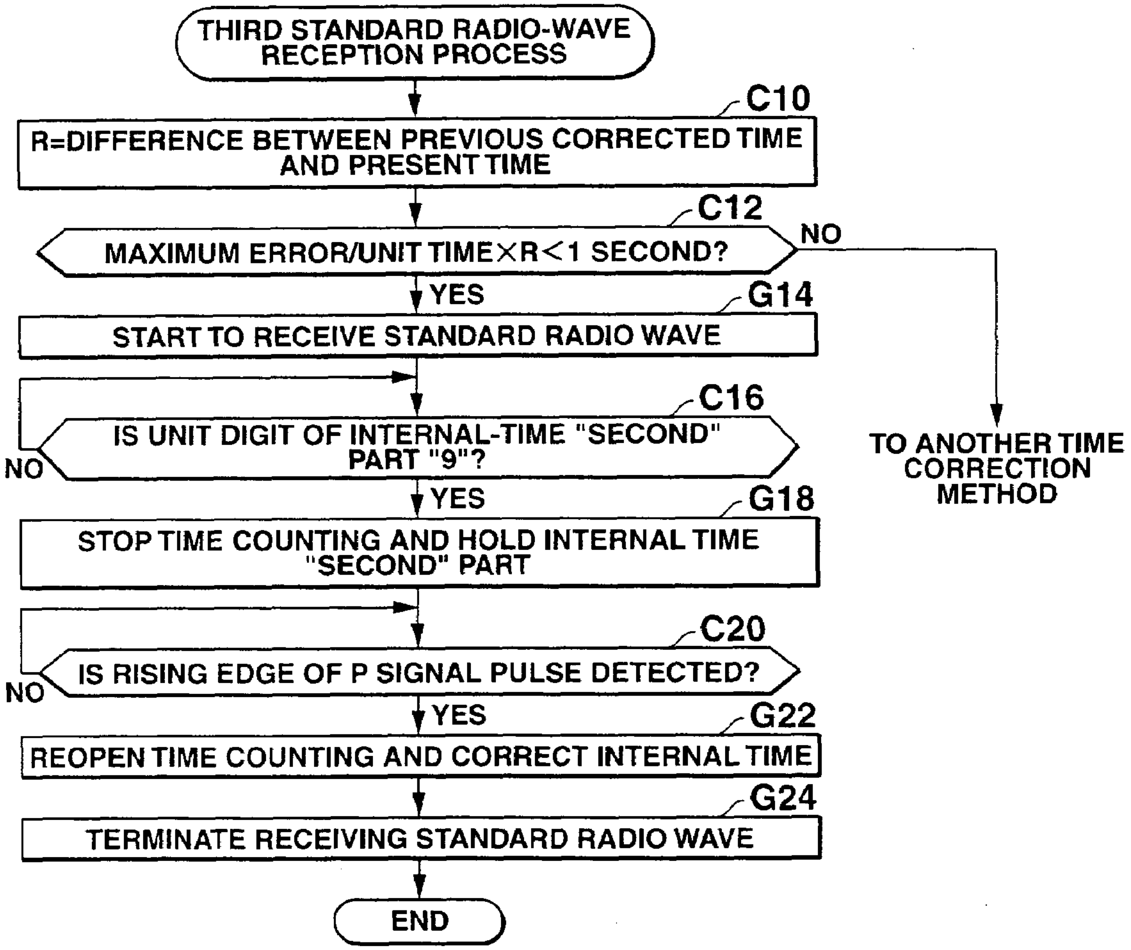
FIG. 8 is a flowchart of a third standard radio-wave reception process to be performed in the third embodiment.

The third standard radio-wave reception process will be described in detail with reference to a flowchart of FIG. 8. As described above, this process is performed when CPU 10 of timepiece 1 executes third standard radio-wave reception program 442.

First, CPU 10 calculates a difference R between a time indicated by previous corrected time data 502 stored in RAM 50 and the present time counted by time counter 80 (step C10). Then, CPU 10 determines whether a numerical value indicative of the product of the maximum error per unit time and difference R is less than 1 (second) (step C12). If not (No in step C12), CPU 10 performs another time correction method, for example, of correcting the internal time based on the above-mentioned first standard radio-wave processing method or time information on received frames 1-3, as performed in the prior art.

When CPU 10 determines that the value indicative of the product is less than 1 second (Yes in step C12), CPU 10 causes radio-wave reception circuit 60 to start to receive the standard radio-wave (step C 14). Then, CPU 10 waits until the unit digit of the "second" part of the internal time becomes "9" (Yes in step C16), at which time CPU 10 causes time counter 80 to stop time counting and to hold the "second" part of the internal time as "9.00"(step C18).

Then, CPU 10 causes radio-wave reception circuit 60 to start to receive the standard radio wave. When a rising edge of a P signal pulse included in the received radio wave is detected (Yes in step C20), CPU 10 causes time counter 80 to restart the time counting (step C22). Then, CPU 10 gives a command to radio-wave reception circuit 60, causing radio-wave reception circuit 60 to terminate the reception of the radio wave (step C24).

A more specified example of this process will be described with reference to FIG. 9 that illustrates a part of the time code. First, CPU 10 causes radio wave reception circuit 60 to start to receive the standard radio wave. Reference character T1 denotes a time when the unit digit of the "second" part of the internal time became "9". Since time counter 80 has the fast error, the time of the standard radio wave has not yet arrived at time "9". At this time T1, CPU 10 causes time counter 80 to stop the time counting and then causes same to hold the "second" part of the internal time at this time. CPU 10 then detects a rising edge of a P (or more particularly P2) signal at a time T2, at which time CPU 10 causes time counter 80 to restart the time counting.

Figure 9:
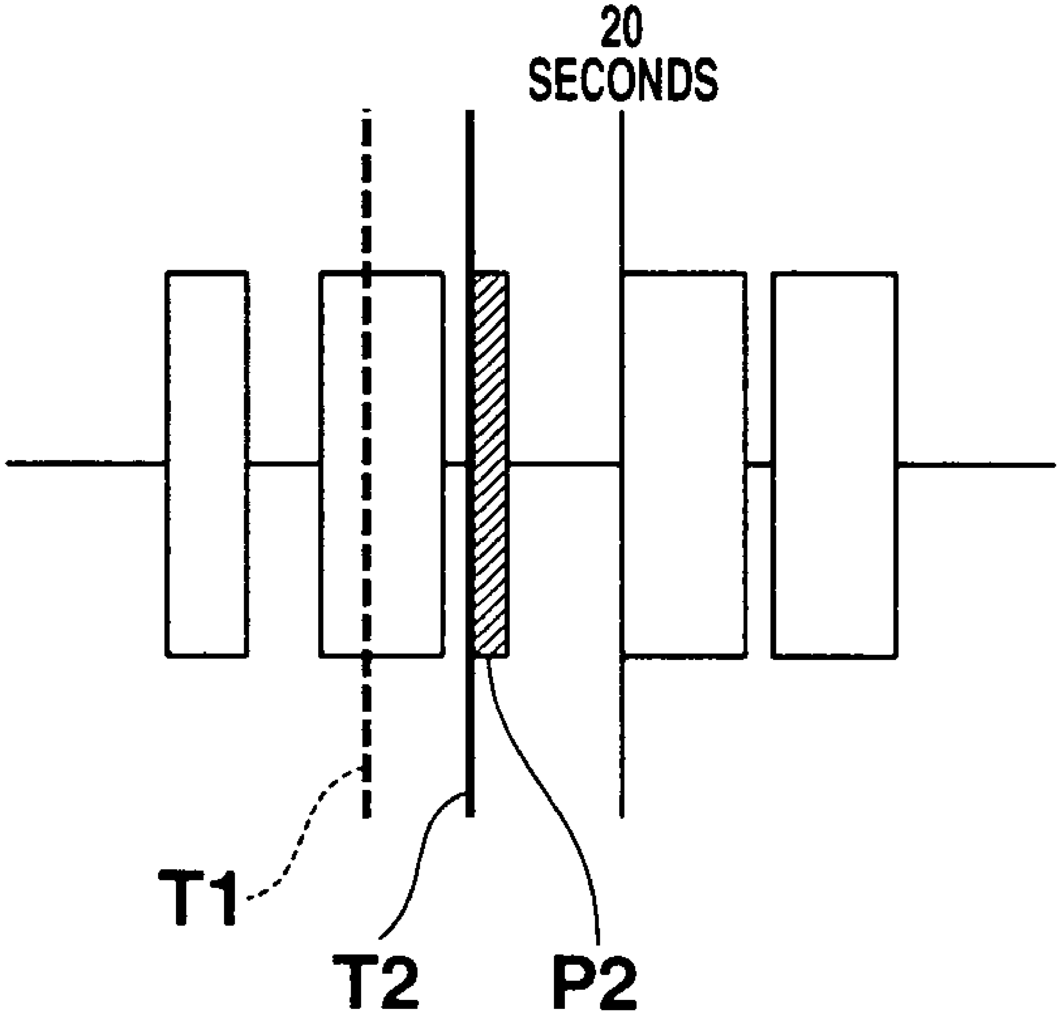
FIG. 9 shows a part of the time code illustrating the third standard radio-wave reception process.

While description has been made specifically in the case of P2 signal with respect to FIG. 9, the same applies to in the case of each of signals P0-P5.

<3.3 Advantages>

As described above, according to the third embodiment, if the unit digit of the "second" part of the internal time becomes "9" when the error is within 1 second, time counter 80 is caused to stop the time counting and when a P signal is then detected, to restart the time counting, thereby correcting the internal time. Thus, reception of the standard radio wave is achieved in a very short time.

<3.4 Modification>

While in the third embodiment the time counting is illustrated as restarted immediately after a rising edge of the P signal pulse is detected, the time may be corrected at a predetermined time, for example, one second after the P signal is received, by considering a time lag involving correction of the internal time. For example, when occurrence of a time lag of 50 milliseconds is considered, a figure indicative of the internal time may be moved one place to the left 950 milliseconds after the P signal was received, thereby changing the unit digit of the internal time to "0"(seconds), which brings about an exact internal time.

While in the third embodiment time counter 80 is illustrated as having a fast error, it may have a slow error, of course. In this case, reception of the standard radio wave should be started at a time when the unit digit of the "second" part of the internal time becomes "8", and then the unit digit of the "second" part of the internal time should be changed to "9" when a rising edge of the P signal pulse is detected.

<3.5 Modification>

While in the third embodiment the time is illustrated as corrected in accordance with the standard radio wave available in Japan, it can be similarly corrected in accordance with a standard radio wave available in a foreign country.

Note that since the time code format of the standard radio wave varies from country to country, the timepiece need be changed in design so as to adapt to the time code format of the standard radio wave in the foreign county concerned.

Figure 10A:
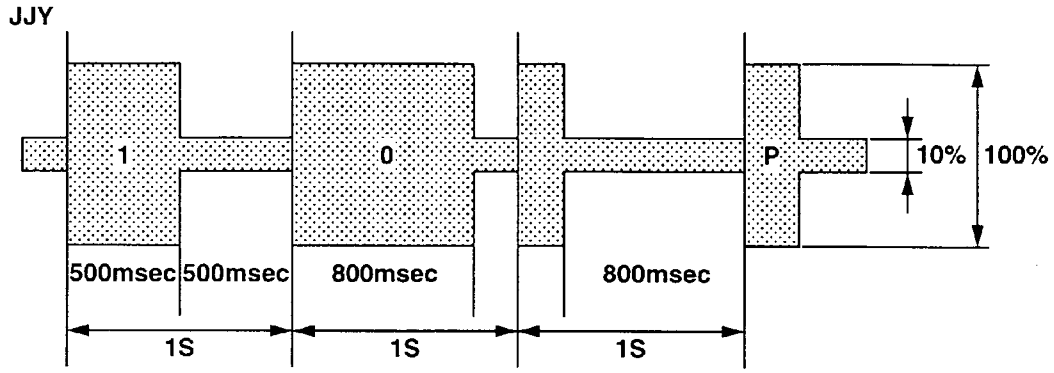
FIGS. 10A-10C illustrate time code formats used in Japan, USA and Germany, respectively.
Figure 10B:
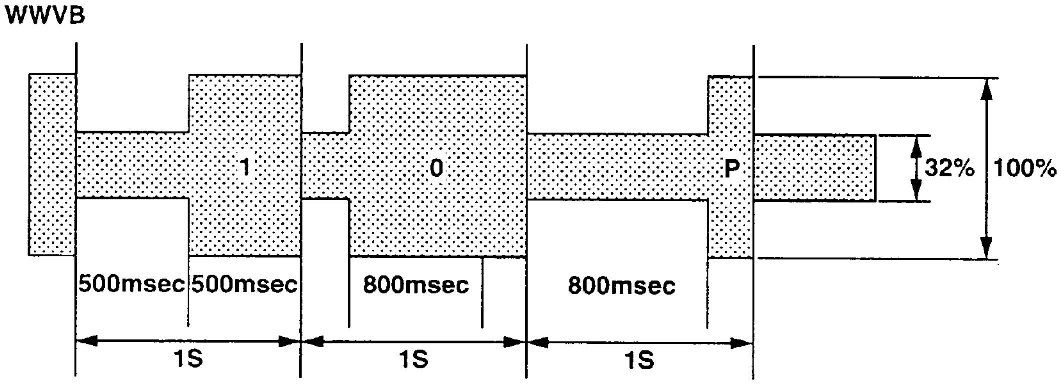
Figure 10C:
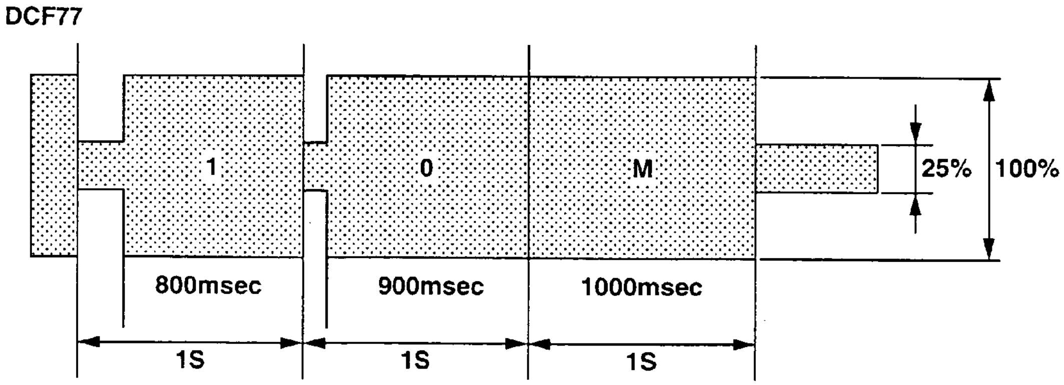

FIGS. 10A-10C illustrate parts of time code formats JJY, WWVB and DCF77 used in Japan, USA, and Germany, respectively. As shown in FIG. 10A, in Japan a pulse signal rises at a "0" second position of its code format while in USA and Germany a pulse signal falls at a "second" position of its time code format. Thus, in order to detect a P signal pulse of the time code in USA, design of the timepiece should be changed such that an end or falling edge of the pulse signal can be detected.

On the other hand, as shown in FIG. 10C, no P signals are included in the Germany's time code. In this case, the internal time may be corrected by using appropriate "o'clock" time data. For example, in FIG. 10C, an M signal may be used as identification data to correct the internal time.

While in the third embodiment the time correction is illustrated by detecting the P signal once, the internal time may be corrected after a plurality of P signals are detected. In this case, reception of the standard radio wave for a long time is required compared with correction of the internal time using single reception of the radio wave, but accurate time correction is achieved even when the standard radio wave is not stabilized due to noise.

Fourth Embodiment

Figure 11:
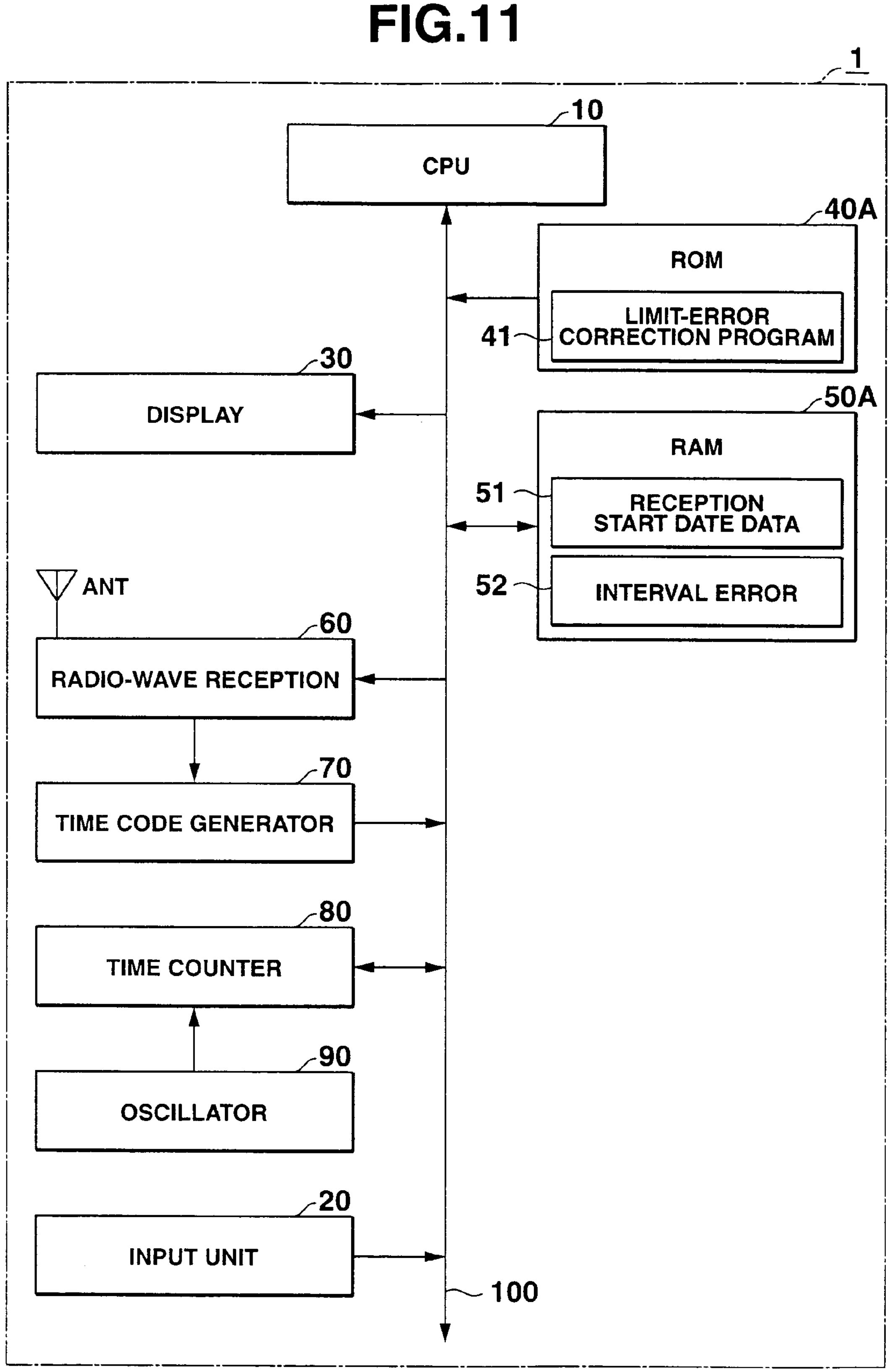
FIG. 11 is a block diagram of a radio wave timepiece according to a fourth embodiment of the present invention.

FIG. 11 is a block diagram of a radio-wave timepiece 1 of the fourth embodiment.

The radio-wave timepiece 1 of the fourth embodiment is obtained by replacing ROM 44 and RAM 50 of the third embodiment of FIG. 7 with ROM 40A and RAM 50A of FIG. 11, respectively.

In timepiece 1, CPU 10 performs a limit error correction process based on a corresponding program 41 stored in ROM 40A, thereby always monitoring whether a reception start date has come. If so, CPU 10 controls radio-wave reception circuit 60 so as to receive the standard radio wave. Then, time code generator circuit 70 receives the standard radio waves from reception circuit 60 and then generates a time code, based on which the internal time data (not shown) being counted by time counter circuit 80 is corrected. CPU 10 also outputs a time display signal based on the internal time data to display 30, thereby updating the display time.

In order to automatically and securely correct an error involving the time counted by time counter 80 by receiving a part of one frame of the time code without receiving the whole frame of the time code, the error should be within a predetermined range, or a limit error. More specifically, in the present embodiment a limit error of ±8 seconds is employed to correct the error based on identification codes, or P signals, disposed at equal intervals of 10 seconds in the time code and other identification codes, or M signals, disposed at respective start points of the frames. That is, a maximum error is ±8 seconds (or 8 seconds fast or slow compared with the standard or correct time). As just described above, the errors include fast and slow errors. For error correction, these two errors should be discriminated. In the embodiment, they are discriminated based on the P and M signals included in the time code and are corrected in corresponding manners. An error involving the time being counted by the time counter built in the wristwatch is on the order of ±15 seconds per month. Thus, if timepiece 1 receives the standard radio wave once in two weeks, the error involving the time being counted falls usually within ±8 seconds.

In the limit error correction process, a time when the error should be corrected is estimated based on the time-counting accuracy of timepiece 1 and the limit error. In addition, a possible error is corrected on condition that the error is always smaller than the limit error. Thus, by performing the limit error correction process, the frequency and time of the radio-wave reception by radio-wave reception circuit 60 of timepiece 1 are restricted to minimum necessary ones.

Figure 17:
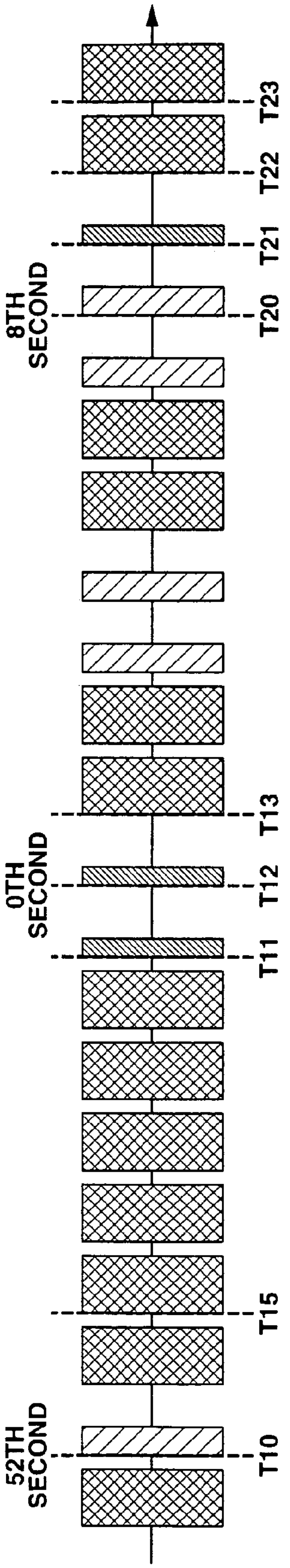
FIG. 17 illustrates the structure of a standard time code to be received in a limit error correction process

A mechanism in which CPU 10 corrects a time-counting error within ±8 seconds in the limit error correction process is deeply involved in the format of time code of the standard radio wave whose part is shown in FIG. 17. When the "second" part of the reception start time is necessarily 0 (seconds), CPU 10 causes radio-wave reception circuit 60 to start to receive the radio wave between times T10 and T11 if the internal time has a fast error within 8 seconds compared with the normal time while CPU 10 causes radio-wave reception circuit 60 to start to receive the radio wave between times T13 and T20 if the time has a slow error within 8 seconds.

When radio-wave reception circuit 60 has started to receive the radio wave between times T10 and T11, CPU 10 detects a P signal at T11 and then an M signal at T12. On the other hand, when radio-wave reception circuit 60 has started to receive the radio wave between times T13 and T20, CPU 10 detects a P signal at T21, but no M signal at T22.

Thus, when CPU 10 has detected the P signal and then a next pulse as an M signal, it is implied that the next pulse has risen at T13. When CPU 10 has detected a P signal, but no next pulse as an M signal, it is implied that the pulse has risen at T23. Thus, with a fast error, the "second" part of the internal time counted by time counter 80 is corrected to time T13 at a rising edge of a pulse following time T12 when the M signal was detected. With a slow error, the "second" part of the internal time is corrected to time T23 at a rising edge of a pulse following time T 22 when no M signal was detected.

When the internal time being counted by time counter 80 involves no error, the standard radio wave starts to be received at time T12 and an M signal is detected simultaneously. Since the P and M signals are the same 0.2 second wide pulse, however, detection of only the M signal is determined to be that of a P signal. Since no M signal is detected at a pulse following time T12 when detection of the M signal was determined to be that of the P signal, this case has the same detection pattern as with the slow error. That is, there is a possibility that time T13 will be wrongly determined as time T22. When the internal time being counted by time counter 80 involves no errors, the "second" part of the internal time at time T13 is "01" while the "second" part of the internal time data at time T22 when the internal time involves a slow error is any one of "02"-"09". Thus, a case in which the internal time involves no errors can be discriminated from a second case in which the internal time involves a slow error.

As described above, CPU 10 determines whether the internal time involves either a fast error or a slow error based on whether a P signal is detected and then an M signal is detected as a following pulse, thereby eliminating an error within ±8 seconds involving the internal time being counted by time counter 80.

RAM 50A has stored various programs to be executed by CPU 10 and data involving the execution of these programs. In FIG. 11, ROM 50A has stored reception start date data 51 and interval error data 52 involving the execution of the limit error correction process.

CPU 10 reads reception start date data 51 when executing the limit error correction process. As shown in FIGS. 12A and 12B, reception start date data 51 comprises a previous reception start date 51*a* and a reception start date 51*b*. Previous reception start date 51*a* represents the latest date when the standard radio wave was received in the limit error correction process. Reception start date 51*b* represent a date when the radio wave is expected to be received next time.

Time correction quantity data 52 represents a time quantity (in seconds) by which the internal time counted by time counter 80 was adjusted so as to coincide with the time of the standard radio wave received this time.

After causing radio-wave reception circuit 60 to receive the standard radio wave in the limit error correction process, CPU 10 calculates as a new reception start date 51*b* an expected date when the time counting error becomes the limit error based on reception start date data 51 and time correction quantity data 52 obtained this time and then updates next reception start date data 51. Then, CPU 10 monitors the date data when time counter 80 counts and then determines whether the date is reception start date 51*b*.

Figure 13:
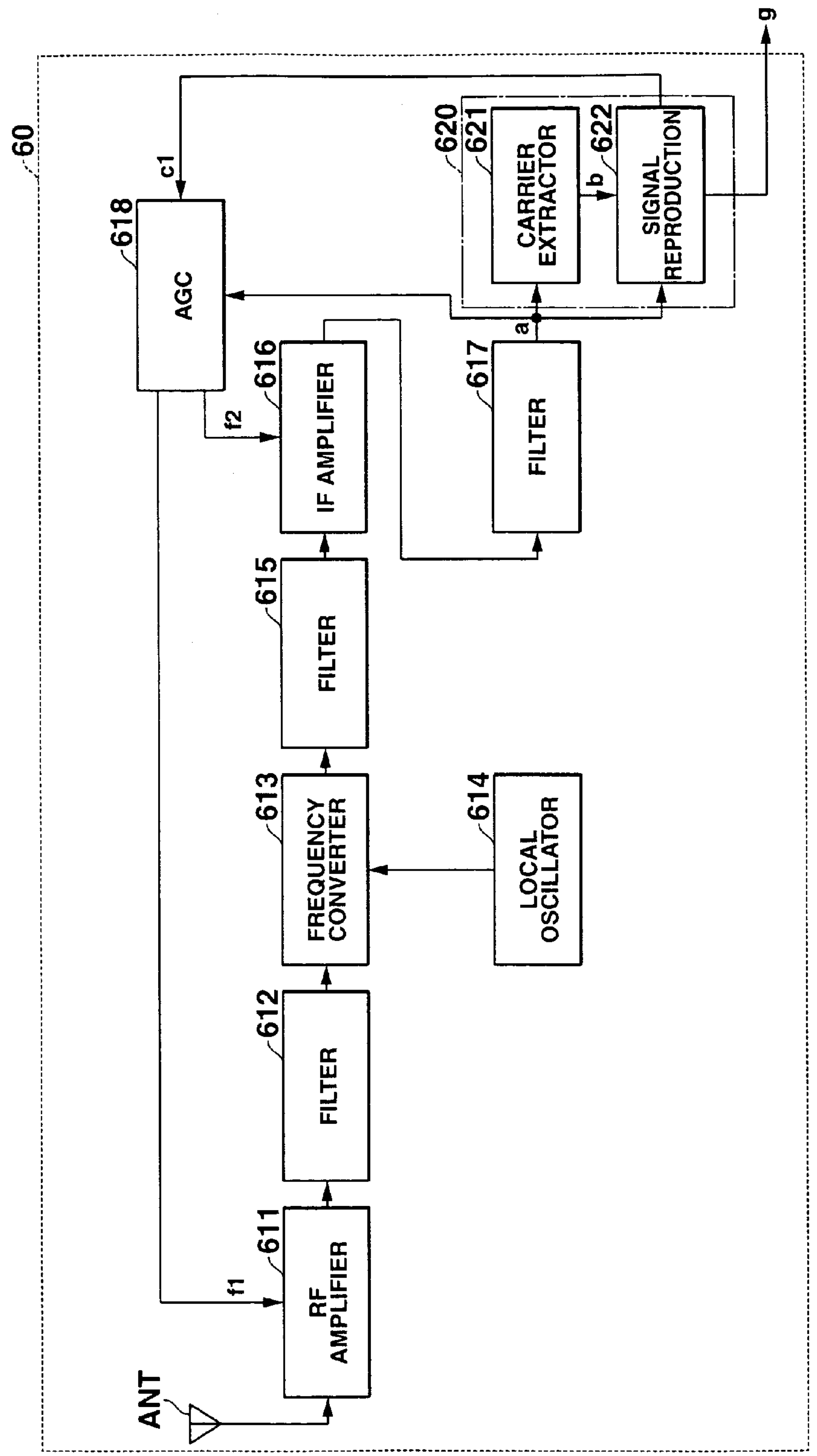
FIG. 13 is a block diagram of a radio-wave reception circuit.

Now, radio-wave reception circuit 60, which is of the superheterodyne type, will be described with reference to FIG. 13. Circuit 60 comprises an antenna ANT, an RF amplifier 611, filter circuits 612, 615 and 617, a frequency converter 613, a local oscillator 614, an IF amplifier 616, an AGC (Auto Gain Control) 618 and a detector 620.

Antenna ANT includes, for example, bar antennas for receiving the standard radio wave which is then converted to an electric signal.

RF amplifier 611 receives the electric signal from antenna ANT and an RF control signal f1 output from AGC circuit 618. RF amplifier 611 amplifies the signal from antenna ANT in accordance with RF control signal f1.

Filter 612 receives a signal from RF amplifier 611, and outputs only frequencies of the signal in a predetermined frequency range by filtering out the frequency components outside the range.

Frequency converter 613 receives a signal from filter 612 and a local oscillation signal from local oscillator 614 and outputs an intermediate frequency signal based on the received signals.

Filter 615 receives the intermediate frequency signal from frequency converter 613, and outputs only frequency components of the signal in a predetermined range whose center is the intermediate frequency.

IF amplifier 616 receives a signal from filter 615 and an IF control signal f2 from AGC 618, and amplifies and outputs the signal from filter 615 in accordance with IF control signal f2.

Filter 617 receives the signal from IF amplifier 616, outputs only a signal comprising frequency components of the signal in a predetermined range.

Detector 620 comprises a carrier extractor 621 and a signal reproduction circuit 622. Carrier extractor 621 is composed, for example, of a PLL (Phase Locked Loop) that receives signal a outputted from filter 617 and outputs a signal b that has the same phase as signal a and a fixed level used as a reference signal.

Signal reproduction circuit 622 receives signals a and b outputted from filter 617 and carrier extractor 621, respectively, and outputs a reproduced signal g and a signal c1 corresponding to a base band signal comprising a reproduced version of signal a.

AGC circuit 618 receives signals a and c1 from filter 617 and signal reproduction circuit 622, respectively, and outputs RF and IF gain control signals f1 and f2 that adjust the amplification degrees of RF and IF amplifiers 611 and 616, respectively, in accordance with the level of signal a.

Figure 14:
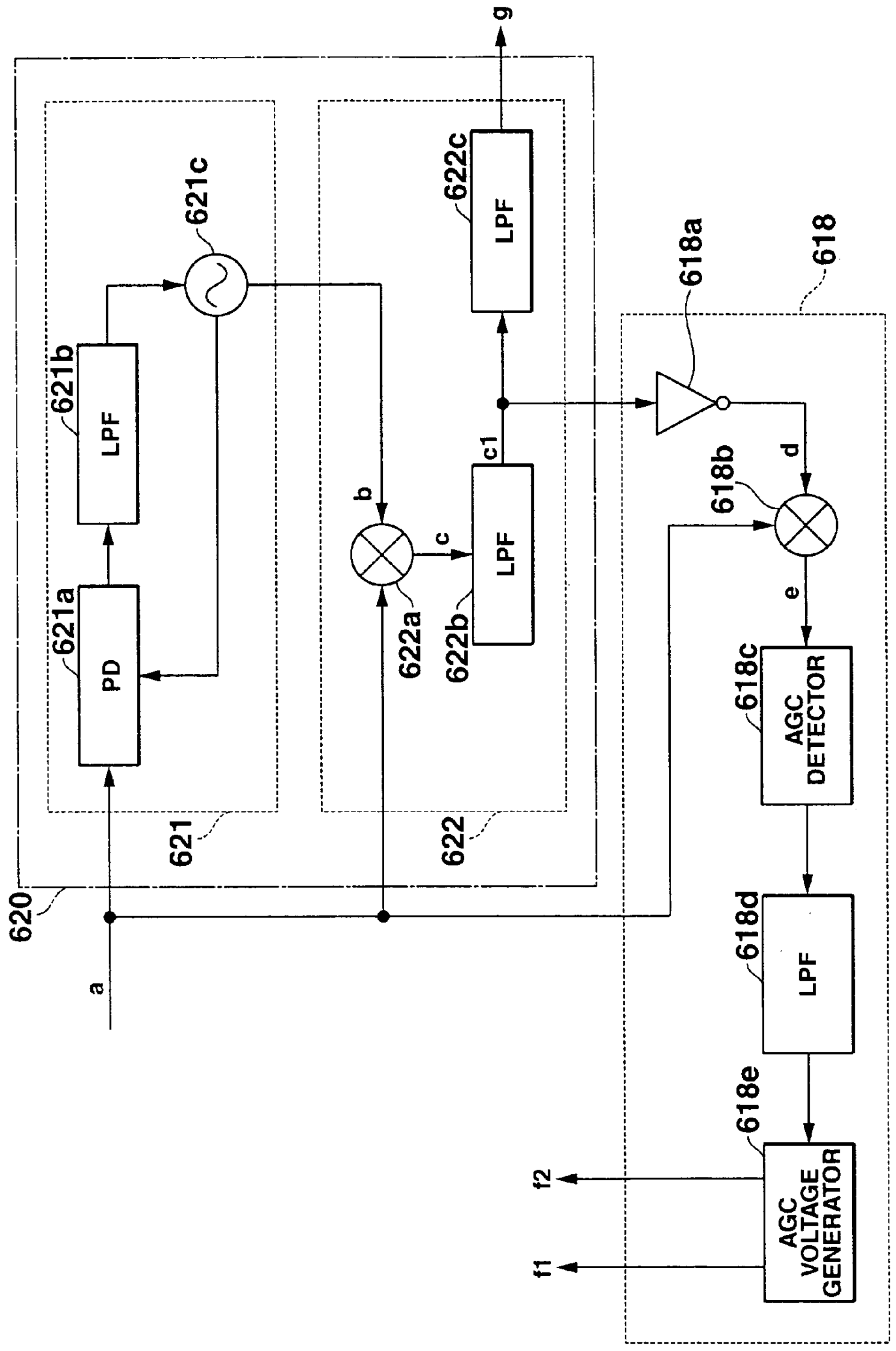
FIG. 14 is a block diagram of a carrier extractor, a signal reproduction circuit and an AGC circuit of the radio wave reception circuit.

FIG. 14 is a block diagram of carrier extractor 621, signal reproduction circuit 622 and AGC circuit 618 of the present embodiment. As shown, carrier extractor 621 comprises a PD (Phase Detector) 621*a*, an LPF (Low Pass Filter) 621*b* and an oscillator 621*c*.

PD 621*a* receives a signal a outputted from filter 617 and a signal outputted from oscillator 621*c*, and compares the phases of these signals and outputs a signal indicative of a result of the comparison.

LPF 621*b* receives from PD 621*a* the signal indicative of the result of the comparison, and allows frequencies of the received signal in a predetermined low-frequency range to pass therethrough and filters out the other frequency components.

Oscillator 621*c* receives a signal from LPF 621*b*, and adjusts the phase of the oscillation signal in accordance with the received signal such that the oscillatory signal is synchronized with a carrier wave of an output signal b.

Signal reproduction circuit 622 comprises a multiplier 622*a*, and LPFS 622*b* and 622*c*. Multiplier 622*a* receives signal a from filter 617 and signal b from oscillator 621*c*, and multiplies signal a by signal b and outputs a resulting signal c.

LPF 622*b* receives signal c from multiplier 622*a*, allows frequency components of signal c in a predetermined low-frequency range to pass therethrough as a signal c1. That is, LPF 622*b* filters out high frequency components of signal a and outputs reproduced signal c1 corresponding substantially to a base band signal of signal a.

LPF 622*c* receives signal c1 from LPF 622*b*, allows frequency components of signal c1 in a predetermined (low-frequency) range to pass therethrough as a signal g by filtering out the other frequency components. Signal g corresponds to a reproduced data signal involving the standard radio wave obtained from radio-wave reception circuit 60.

AGC circuit 618 comprises an inverting amplifier 618*a*, a multiplier 618*b*, an AGC detector 618*c*, an LPF 618*d* and an AGC voltage generator 618*e*.

Inverting amplifier 618*a* receives signal c1 from LPF 622*b*, inverts and amplifies signal c1 and outputs a resulting signal d.

Multiplier 618*b* receives signal a from filter 617 and signal d from inverting amplifier 618*a*, multiplies signal a by signal d, and outputs a resulting signal e.

AGC detector 618*c* receives signal e outputted from multiplier 618*b*, and (peak) rectifies signal e and outputs a resulting signal.

LPF 618*d* receives a signal from AGC detector 618*c*, and allows frequency components of the received signal in a predetermined (low-frequency) range to pass therethrough by filtering out the other frequency components.

AGC voltage generator 618*e* receives the signal from LPF 618*d*, and outputs RF and IF control signals f1 and f2 that control the amplification factors of RF and IF amplifiers 611 and 616, respectively, in accordance with the level of the received signal.

<Operation>

Operation of radio-wave receiver circuit 60 will be described next with reference to a flowchart of FIG. 15. FIG. 16 schematically illustrates waveforms of the respective signals that flow through circuit 60.

Figure 15:
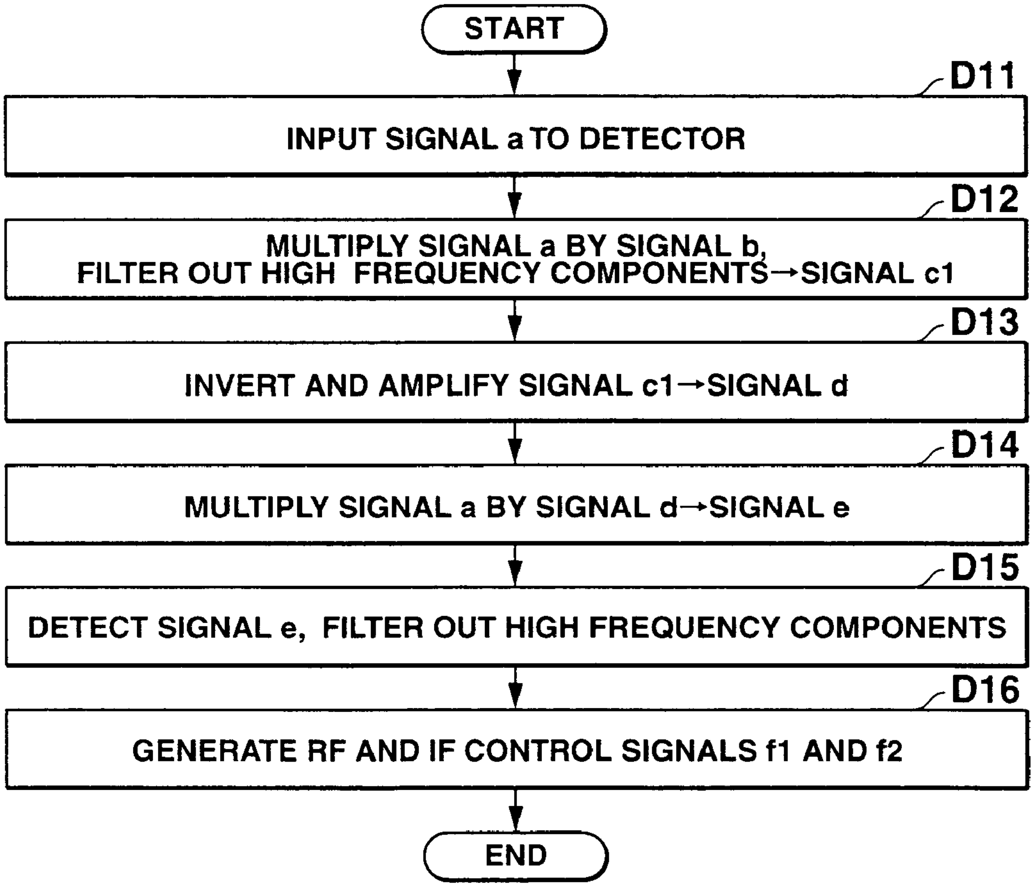
FIG. 15 is a flowchart of a process to be performed by a radio-wave reception circuit.

Referring to FIG. 15, the standard radio wave received by antenna ANT is converted to an electric signal that is then outputted to RF amplifier 611, which amplifies or attenuates the received signal in accordance with RF control signal f1 from AGC circuit 618 and outputs a resulting signal via filter 612 to frequency converter 613.

Frequency converter 613 converts the receives signal to a predetermined intermediate frequency signal, which is then outputted via filter 615 to IF amplifier 616. IF amplifier 616 amplifies or attenuates the received signal in accordance with IF control signal f2 received from AGC circuit 618, and outputs a resulting signal a via filter 617 to detector 620 (step D11). As shown in FIG. 16A, signal a has 10 and 100% amplification modulation degrees.

In detector circuit 620, carrier extractor 621 outputs signal b synchronized in phase with the carrier wave of signal a. Multiplier 622*a* of signal reproduction circuit 622 multiplies signal a by signal b, and outputs a resulting signal c. LPF 622*b* filters out high frequency components of signal c and as shown in FIG. 16C, outputs signal c1 corresponding substantially to a base band signal of signal a (step D 12).

Then, inverting amplifier 618*a* of AGC circuit 618 inverts and amplifies signal c1 and outputs a resulting signal d (step D13). Then, multiplier 618*b* multiplies signal a by signal d and outputs a resulting signal e (step D14). As shown in FIG. 16E, signal e has a substantially constant amplitude substantially equal to a maximum one of signal a although signal e is shown in a reduced size.

Then, AGC detector 618*c* detects signal e (for example, at its peak), outputs a resulting signal to LPF 618*d*, which filters out high frequency components of detected signal e and outputs a resulting signal to AGC voltage generator 618*e* (step D15).

Then, AGC voltage generator 618*e* generates RF and IF control signals f1 and f2 that control the amplification factors of RF and IF amplifiers 611 and 616, respectively, in accordance with a level of the received signal thereof (step D 16).

As described above, radio-wave reception circuit 60 multiplies intermediate frequency signal a by an inverted version d of signal c1 (substantially equal to, more specifically, signal g) reproduced by signal reproduction circuit 622, or modulates signal a with signal c1, thereby generating RF and IF control signals f1 and f2 that control the amplification factors of RF and IF amplifiers 611 and 616, respectively, in accordance with a level of modulated signal e. Thus, AGC detector 618*c* idealistically detects signal e having only intermediate frequency components. Thus, no filter having a time constant larger than the cycle of the received amplitude modulation signal need be provided to perform the AGC operation, thereby achieving high-speed AGC operation irrespective of the cycle of the amplitude modulation signal.

As described above, radio-wave reception circuit 60 adjusts the reception gain using the high-speed AGC operation immediately after the standard radio waves starts to be received, thereby outputting the appropriate frequency signal to time code generator 70. Time code generator 70 generates a standard time code having a format of FIG. 17 based on the electric signal outputted from radio-wave reception circuit 60 and then provides it to CPU 10. Thus, a time lag extending from the start of the radio wave generation to generation of the time code is greatly reduced.

Time counter 80 counts clock signals outputted from oscillator 90 and outputs the counted clock signals as internal time data to CPU 10. Oscillator 90, composed of a crystal oscillator, outputs clock signals of a fixed frequency to time counter 80.

Figure 18:
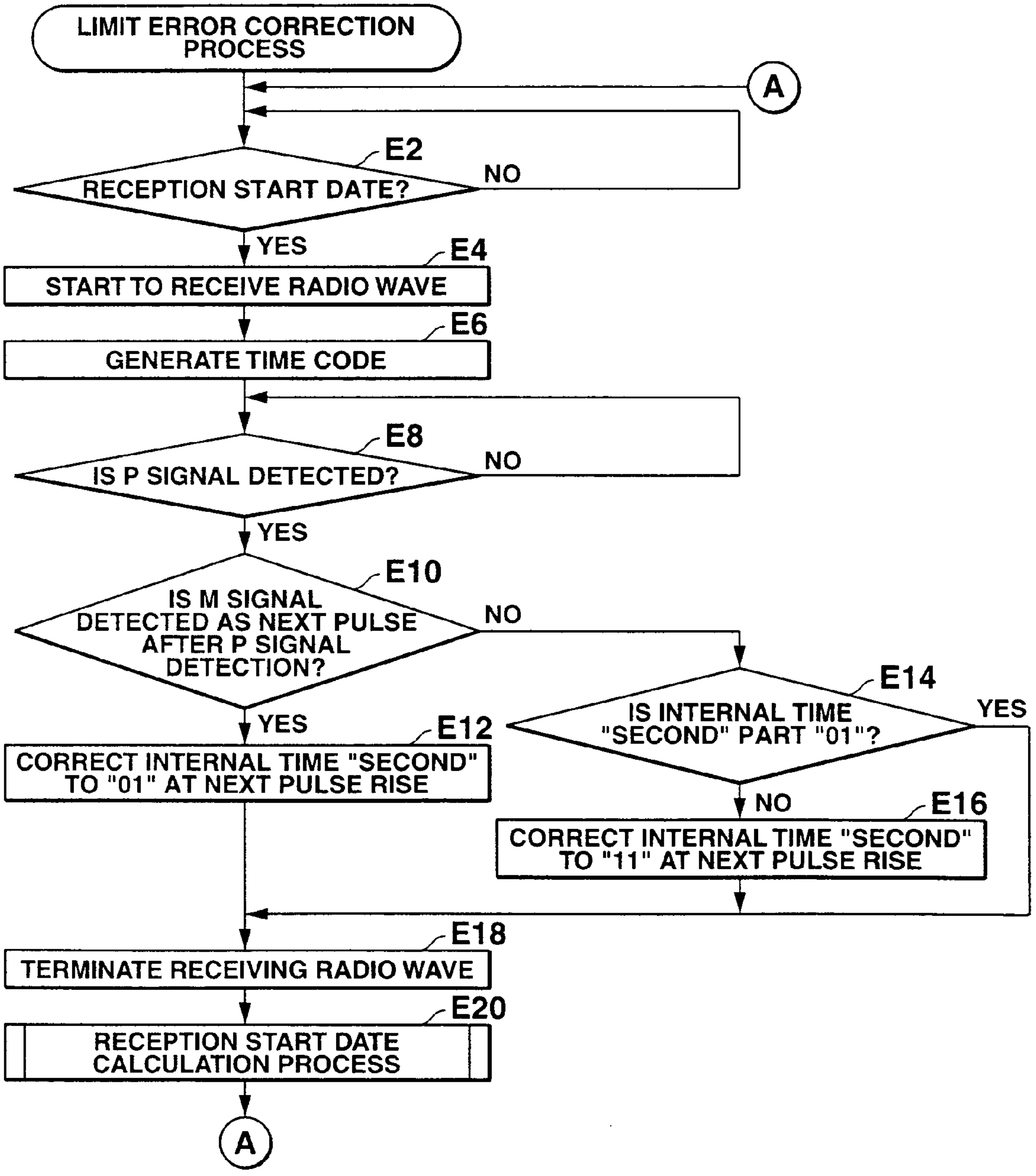
FIG. 18 is a flowchart of a limit error correction process.

The limit error correction process to be performed in timepiece 1 will be described with reference to a flowchart of FIG. 18. CPU 10 continuously at all times reads and executes a limit error correction process program 41 stored in ROM 40A.

CPU 10 monitors whether the internal time data represents a reception start date (step E2). If so (Yes in step E2), CPU 10 controls radio-wave reception circuit 60 so as to start to receive the standard radio wave (step E4). The radio wave received by radio-wave reception circuit 60 is outputted to time code generator 70, as required. Time code generator 70 generates a time code based on the received radio wave and then outputs it to CPU 10 (step E6).

When CPU 10 determines that a P signal included in the received time code has been detected (Yes in step E8), and then detects a next pulse as an M signal (Yes in step E10), CPU 10 causes time counter 80 to correct a "second" part of the internal time data to "01" when the next pulse has risen (step E12). When no pulse has been detected as an M signal immediately after the P signal has been detected (No in step E10) and the "second" part of the internal time data is "01" (Yes in step E14), CPU 10 determines that there is no error involved. On the other hand, when the "second" part is not "01" (No in step E14), CPU 10 determines that the internal time data has a slow error. In order to correct this error, CPU 10 responds to a rising edge of a next pulse to control time counter 80 so as to correct the "second" part of the internal time data to "11" (step E16). After correcting the error, CPU 10 controls radio-wave reception circuit 60 so as to terminate the reception of the standard radio wave rapidly (step E18).

Then, CPU 10 performs a reception start date calculation process (step E20), thereby calculating a new reception start date and updating reception start date data 51 stored in RAM 50A.

Figure 19:
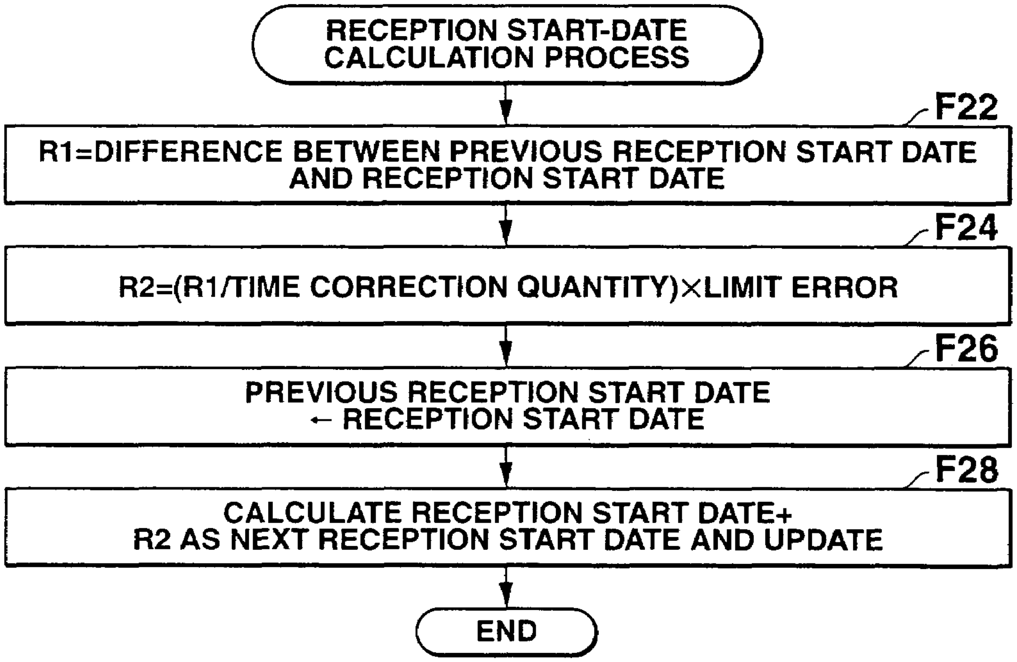
FIG. 19 is a flowchart of a reception start date calculation process.

Referring to a flowchart of FIG. 19, this process will be described in more detail. First, CPU 10 reads from ROM 50A previous reception start date 51*a* and reception start date 51*b* (indicative of the date when the reception of the radio wave was started this time) of reception start date data 51 and calculates a difference R1 between these dates (step F22). Then, CPU 10 reads time correction quantity data 52 from RAM 50A, divides R1 by data 52, and multiplies a resulting value by an absolute value of a limit error (in the present embodiment, ±8), thereby providing a resulting product R2 (step F24). This implies that a time required for one second of an error to occur in timepiece 1 is calculated based on the error that has occurred in timepiece 1 from the previous reception of the standard radio wave to the reception of the standard radio wave effected this time, and then that a time required for the error in timepiece 1 to arrive at the limit error is calculated on assumption that a next error will occur at this calculated rate.

CPU 10 then overwrites previous reception start date 51*a* of reception start date data 51 stored in RAM 50A with reception start date data 51*b* when the reception of the radio wave was started this time (step F26). Then, CPU 10 adds calculated R2 to expected reception start date 51*b* and updates reception start date data 51*b* of reception start date data 51 stored in RAM 50A with the resulting data (step F28).

Now, referring to FIGS. 12A and 12B, a specified example of the reception start date calculating process will be described. FIGS. 12A and 12B indicate start dates of nth and (n+1)th receptions, respectively, of the standard radio-wave. That is, reception start date data 51 of FIG. 12B is obtained by updating corresponding data 51 of FIG. 12A. Now, it is assumed that the internal time was adjusted by a time correction quantity of 6 seconds so as to coincide with the time of the nth received standard radio wave. In this case, a next expected reception start date 51*b* calculated in the reception start date calculating process is "14 Oct., 2005 16:0:00", as shown in FIG. 12B. This estimated date is obtained by subtracting previous-reception start date 51*a* "26 Sep., 2004 00:0:00" represented by reception start date data 51 of FIG. 12A from reception start date 51*b* 4 Oct., 2004 00:00:00" when the reception of the radio wave was started this time, thereby providing a difference of 8 days, which is then divided by time correction quantity of 6 (seconds), thereby providing one day and 8 hours. This time including one day and 8 hours is then multiplied by 8, which is an absolute value of the limit error, thereby providing 10 days and 16 hours. Then, the time of 10 days and 16 hours is added to reception start date 51*b* "4 Oct., 2004 00:00:00" represented by reception start date data 51 of FIG. 12A, thereby providing expected reception start date 51*b* "14 Oct., 2004 16:0:00" of FIG. 12B.

In summary, the present time-counting accuracy of timepiece 1 is calculated based on the time elapsed from previous reception start date 51*a* to reception start date 51*b* when the reception of the radio wave was started this time, and time correction quantity 52 used this time. Then, a time when an error occurring under this time-counting accuracy arrives at 8 seconds, which is the limit error, is estimated. Then, a next reception start date 51*b* is calculated, which is a time when the standard radio wave should be received next, thereby correcting the error involving the internal time of timepiece 1. Thus, since the error involving the internal time is always within an allowable range, radio-wave reception circuit 60 is caused to receive the radio wave for a minimum required time in the limit error correction process, thereby correcting an error involving the "second" part of the internal time automatically and hence maintaining an accurate internal time at all times.

When the reception start date calculating process ends, CPU 10 again performs the reception start date calculating process without terminating the limit error correcting process, thereby reopening monitoring whether the internal time data represents reception start date 51*a*.

As described above, in accordance with timepiece 1 of the present embodiment, a time when an occurring error arrives at the limit error is estimated, thereby providing a date when the error should be corrected. When the time has come, the standard radio wave is received and then the error is corrected. In timepiece 1, these steps are executed, thereby providing a minimum-time receiving operation automatically at the time when the error should be corrected without performing useless reception. Therefore, compared with the prior art timepiece, the reception time and hence the power consumption are greatly reduced.

Fifth Embodiment

Figure 20:
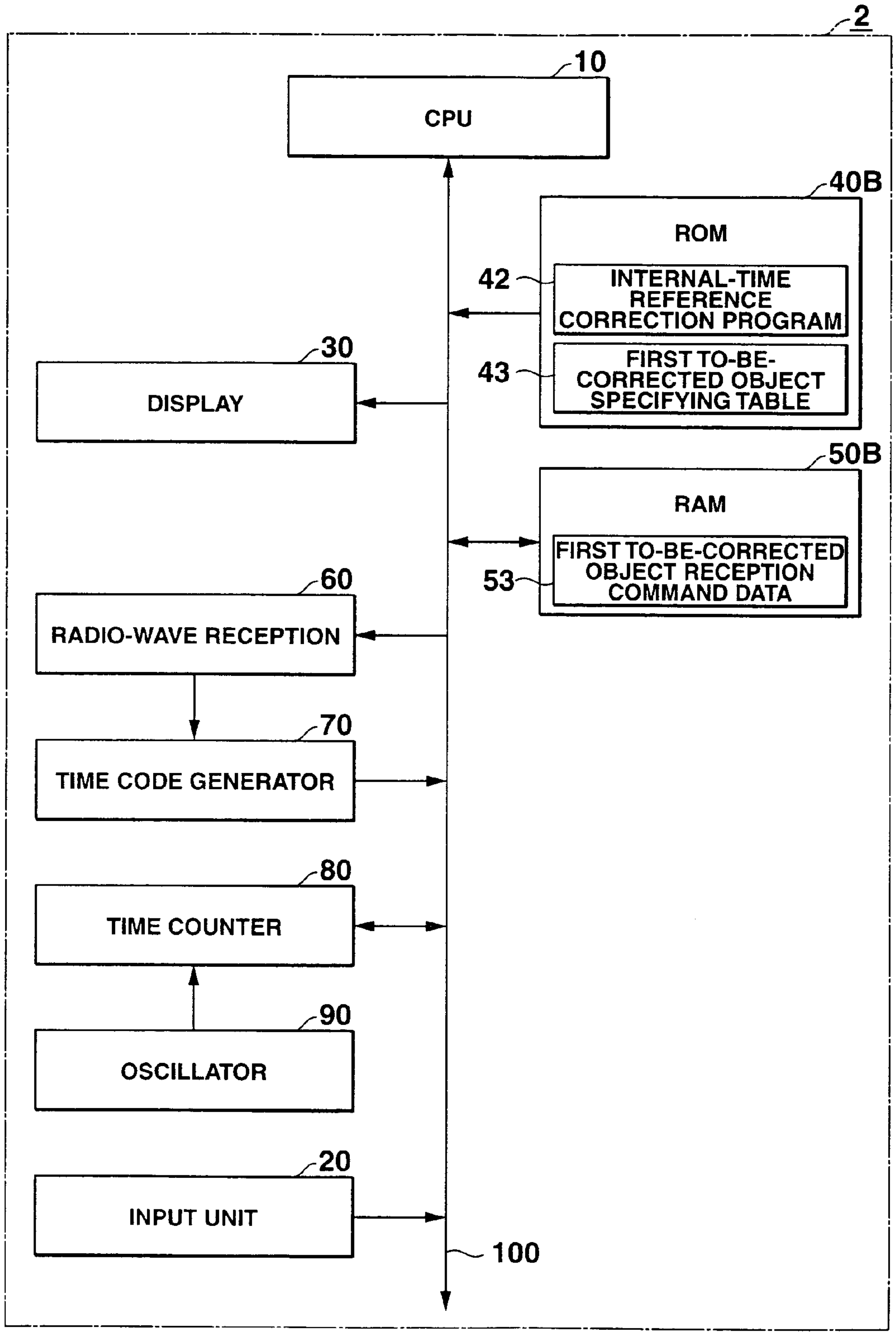
FIG. 20 is a block diagram of a radio-wave timepiece as a fifth embodiment of the present invention.

FIG. 20 is a block diagram of a fifth embodiment of a radio-wave timepiece 2.

Referring to FIG. 20, timepiece 2 of the present embodiment is obtained by replacing ROM 40A and RAM 50A of the fourth embodiment with ROM 40B and RAM 50B, respectively.

Like ROM 40A, ROM 40B has stored an internal time reference correction process program 42 and a first to-be-corrected object specifying table program 43 in addition to other programs and data.

CPU 10 performs an internal time reference correction process based on corresponding program 42, thereby receiving a part of one frame of a time code of the standard radio wave and correcting the corresponding internal time being counted by time counter 80. Parts of the internal time data to be corrected are prescribed on first to-be-corrected object specifying table 43.

As shown in the time code format of the standard radio wave of FIG. 1, one frame comprises date data involving "minutes", "o'clock", and "day of the year" divided in units of a second and disposed in respective specified parts thereof. Thus, when only a part of the time code corresponding to a part of the internal time to be corrected is received in the internal-time reference correcting process, the "second" part of the internal time data must coincide accurately with that of the time code of the standard radio wave. Thus, immediately before the part of the time code corresponding to that of the internal time data to be corrected is received, an M signal included in the time code should be detected and the "second" part of the internal time data should be corrected to "00". After this correction, only the part of the time code corresponding to that of the internal time data to be corrected is received based on first to-be-corrected object specifying table 43.

FIG. 21 illustrates first to-be-corrected object specifying table 43. As shown, table 43 comprises execution day data 43*a*, to-be-corrected object data 43*b* and acquire-location data 43*c*. For example, when execution day 43*a* is set to "1 Oct., 2004", part of the internal time data (or object) to be corrected is determined to be "o'clock" data in accordance with to-be-corrected object specifying data 43*b*. Acquire location 43*c* for the "o'clock" data is "12-19", which indicates a "12th-19th" second location of the time code of the standard radio wave of FIG. 1 to be acquired to correct the "o'clock" data. Thus, "o'clock" data as to-be-corrected object data 43*b* for "Jan. 10, 2004" of execution day 43*a* should be acquired from the 12th-19th second location of the time code.

Like RAM 50A, RAM 50B has stored or stores various programs and data involving execution of these programs. As shown in FIG. 20, RAM 50B has stored first to-be-corrected object reception command data 53. As shown in FIG. 22, data 53 has a similar structure to first to-be-corrected object specifying table 43. This is because first to-be-corrected object specifying table 43 is searched for an execution day closest to the day when the standard radio wave was received and command data corresponding to the appropriate execution day 43*a* is read from first to-be-corrected object specifying table 43 and written as first to-be-corrected object reception command data 53 into RAM 50B. Note that execution date 53*a* comprises execution date 43*a* appearing on first to-be-corrected object specifying table 43 plus a time when the internal time reference correcting process is executed. While the time data is illustrated as "02:00 a.m.", the present invention is not limited to this particular time data, but any other appropriate time may be specified.

Figure 23:
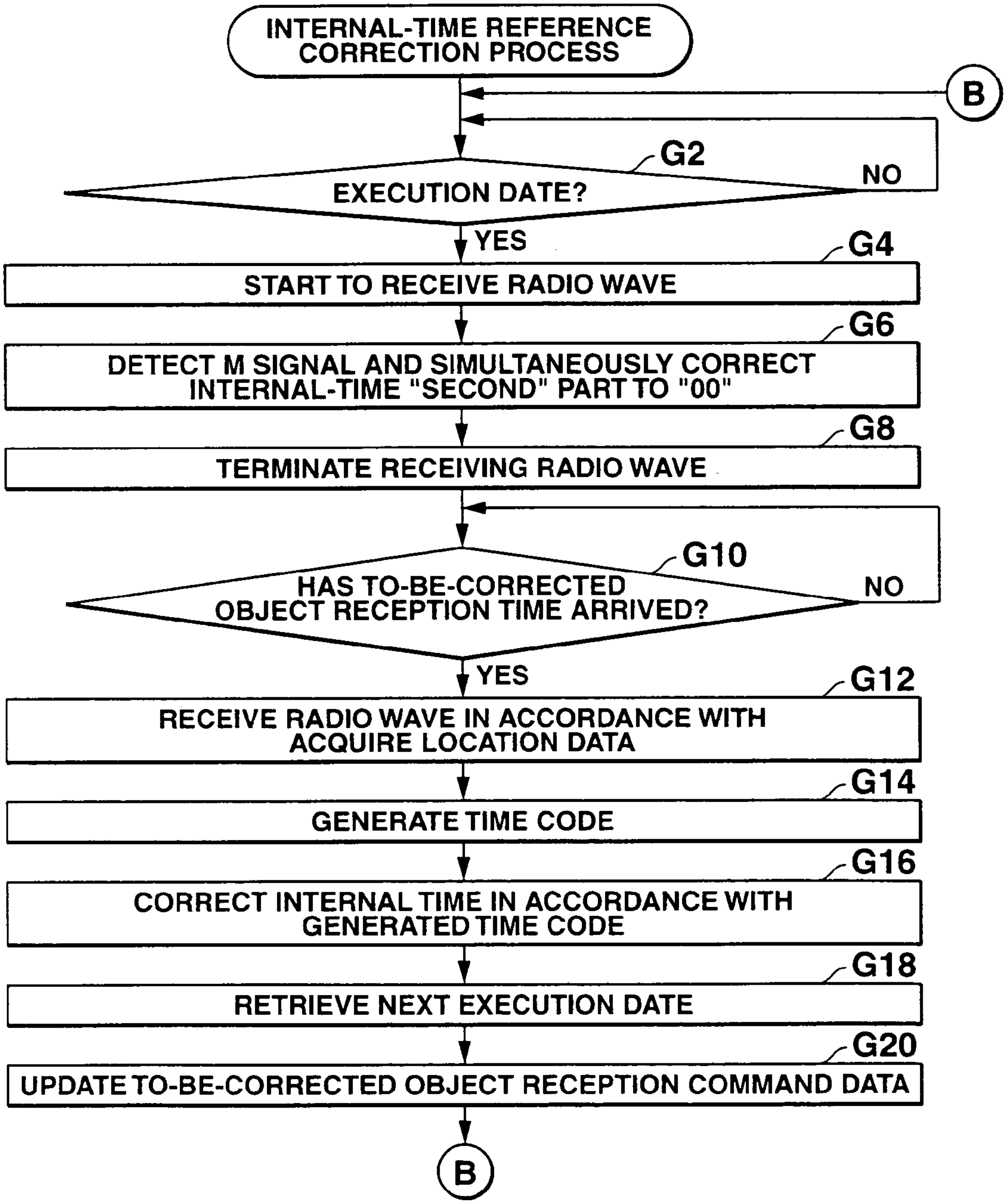
FIG. 23 is a flow chart of an internal time reference correction process.

The internal time reference correction process of timepiece 2 will be described in detail with reference to a flowchart of FIG. 23. CPU 10 executes internal time reference correction program 42 stored in ROM 40B, thereby starting the corresponding process of FIG. 23.

CPU 10 always monitors whether the internal time being counted by time counter 80 has arrived at execution date 53*a* indicated by first to-be-corrected object reception command data 53 (step G2). If so (Yes in step G2), CPU 10 controls radio-wave reception circuit 60 to start to receive the standard radio wave (step G4). A signal indicative of the received standard radio wave is outputted to time code generator 70, as required. Time code generator 70 generates a time code based on the received signal and outputs it to CPU 10. CPU 10 detects an M signal from the signal received from time code generator 70, and then corrects a "second" part of the internal time data to "00" (step G6). Immediately after the M signal has been detected, CPU 10 temporarily terminates reception of the standard radio wave by radio-wave reception circuit 60 (step G8).

CPU 10 monitors whether the "second" part of the internal time data has arrived at a time of seconds indicated in an acquire location 53*c* in first to-be-corrected object reception command data 53 (step G10) If so (Yes in step G10), CPU 10 causes radio-wave reception circuit 60 to start to receive the standard radio wave and then terminates the reception of the radio wave at a time of "seconds" indicated in acquire location 53*c* (step G12). A signal indicative of the standard radio wave received by reception circuit 60 is outputted to time code generator 70 as required. Time code generator 70 generates a time code from the signal received as required and then outputs it to CPU 10 (step G14). CPU 10 then causes time counter 80 to correct the internal time data based on the time code received from time code generator 70 (step G16). As shown in FIG. 22, the reception of the time code starts at a 12th second location and ends at a 19th second location, and only "o'clock" data of the internal time data is corrected based on this received time code.

Then, CPU 10 determines a day nearest and after the day when the internal time data was corrected this time based on first to-be-corrected specifying table 43 (step G18), reads from table 43 command data corresponding to determined execution day 43*a* and writes it as first to-be-corrected object reception command data 53 to RAM 50B for updating purposes (step G20). The day nearest and after execution day date 53*a* "January 4, 02:00 a.m." is "every Sunday" in FIGS. 21 and 22. If that execution date 53*a* is Monday, a new execution date 53*a* is determined to be "July 4, 02:00 a.m.". CPU 10 then reopens to monitor whether the internal time data has arrived at new execution date 53*a* without terminating the internal time reference correction process.

As described above, according to timepiece 2 of the present embodiment, only a part of the internal time data predetermined on first to-be-corrected object specifying table 43 is corrected based on a date predetermined on the table. In order to receive a required part of one frame of the time code corresponding to the "second" part of the internal time data, the "second" part of the internal time is monitored and the timepiece waits starting to receive the standard radio wave until immediately before the required part of the time code appears. Thus, useless reception is eliminated greatly, and the reception time and hence the power consumption are greatly reduced compared with the prior art.

Sixth Embodiment

Figure 24:
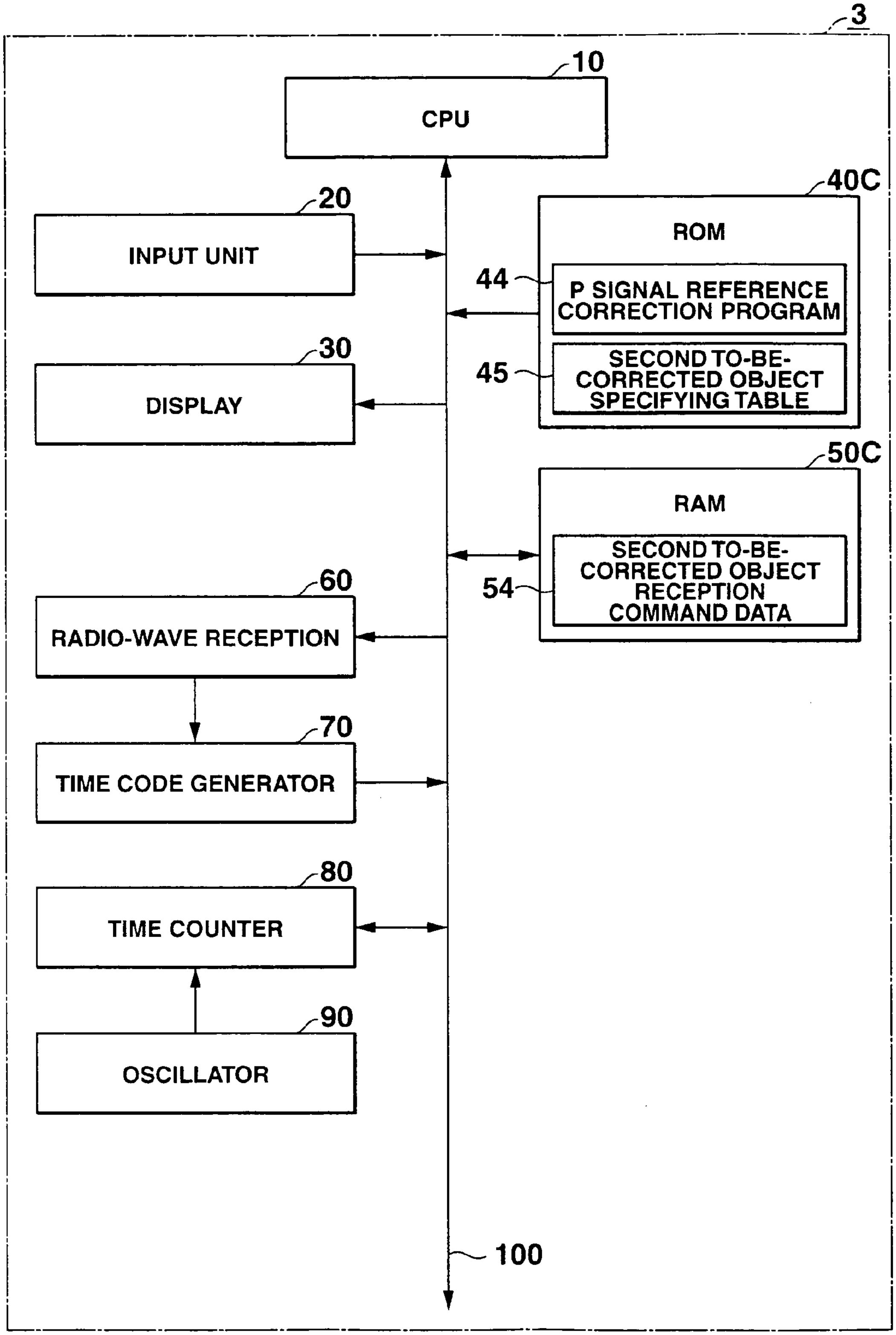
FIG. 24 is a block diagram of a radio-wave timepiece according to a sixth embodiment of the present invention.

FIG. 24 is a block diagram of a sixth embodiment of a radio-wave timepiece 3. As shown in FIG. 24, timepiece 3 is obtained by replacing ROM 40A and RAM 50A of the fourth embodiment with a ROM 40C and a RAM 50C, respectively.

Like ROM 40A, ROM 40C has stored various programs and data. As shown in FIG. 24, ROM 40C has stored a P signal reference correction program 44 to perform a corresponding process, and a second to-be-corrected object specifying table 45 that has stored data involving execution of the P signal reference correction process.

CPU 10 performs the P signal reference correction process, thereby correcting a part of the internal time data being counted by time counter 80. The parts of the internal time data to be corrected are predetermined on second to-be-corrected object specifying table 45.

FIG. 25 illustrates second to-be-corrected object specifying table 45. Referring to FIG. 25, table 45 comprises execution day data 45*a*, to-be-corrected object data 45*b*, acquire location data 45*c*, P signal start count data 45*d* and P signal end count data 45*e*. The P signal reference correction process of the present embodiment comprises acquiring a part of the received time code corresponding to to-be-corrected object data 45*b* of the internal time data based on the number of times the P signal included in the received time code was received and not based on the internal time being counted by time counter 80, and then correcting object data 45*b* with that part of the time code. To this end, the start and end counts 45*d* and 45*e* of P signals which are not included on first to-be-corrected object specifying table 43 are additionally employed on table 45.

Referring to FIG. 24, RAM 50C has stored second to-be-corrected object reception command data 54 to cause the P signal reference correction process to be performed.

FIG. 26 illustrates second to-be-corrected object reception command data 54. In FIG. 26, data 54 is similar in structure to second to-be-corrected object specifying table 45 of FIG. 25. This is because as in first to-be-corrected object reception command data 53 of the fifth embodiment, an execution day nearest and after the day when the error involving the internal time data was corrected is retrieved from second to-be-corrected object specifying table 45, and then command data corresponding to the appropriate execution day 45*a* is read from second to-be-corrected object specifying table 45 and written as second to-be-corrected object reception command data 54 into RAM 50C. Note that execution data 54*a* comprises data on an execution day 45*a* specified on second to-be-corrected object specifying table 45 and data on a time when the P signal reference correction process is executed. This time data represents a predetermined prescribed time and in the present embodiment, "2:00 a.m.". However, the present invention is not limited to this specified time.

Figure 27:
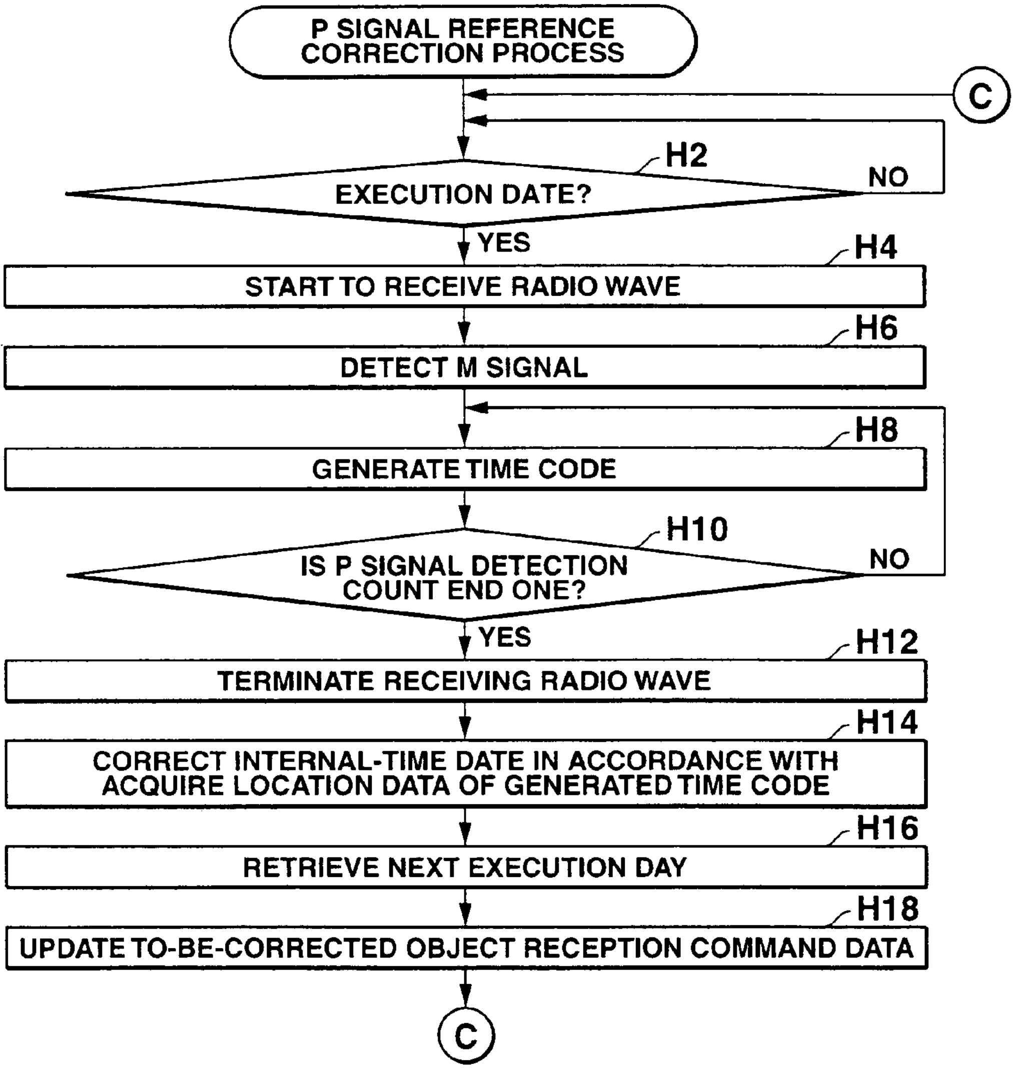
FIG. 27 illustrates a P signal reference correction process.

The P signal reference correction process to be performed in timepiece 3 will be described with reference to a flowchart of FIG. 27. CPU 10 starts to perform the P signal reference correction process by executing the corresponding program 44 stored in ROM 40C.

CPU 10 always monitors whether the internal time being counted by time counter 80 has arrived at execution date 54*a* included in second to-be-corrected object reception command data 54 stored in RAM 50C (step H2). If so (Yes in step H2), CPU 10 causes radio-wave reception circuit 60 to start to receive the standard radio wave (step H4). The received radio wave is inputted to time code generator 70, as required. Generator 70 then generates a time code from the received signal and outputs it to CPU 10. CPU 10 detects an M signal from the signal received from time code generator 70 (step H6) and monitors a time code received from time code generator 70 (step H8). CPU 10 counts the number of P signals detected and monitors whether it has arrived at the end count 45*e* of P signals included in second to-be-corrected object reception command data 54 (step H10).

When CPU 10 determines that the number of times the P signal included in the received time code was detected has arrived at P signal end count 45*e* (Yes in step H10), CPU 10 causes radio-wave reception circuit 60 to terminate reception of the radio wave (step H12). Then, CPU 10 causes time counter 80 to correct the internal time data based on an acquire location 54*c* of the time code received from time code generator 70 (step H14). As shown in FIG. 26, only day of the year data of the internal time data is corrected based on the received time code. After detecting four P signals, which brings about the P signal end count, CPU 10 causes radio wave reception circuit 60 to terminate receiving the radio wave rapidly.

Then, CPU 10 determines, as a new execution day 45*a*, a day nearest and after the day when the internal time was corrected this time on second to-be-corrected object specifying table 45 (step H16), reads command data corresponding to the determined execution day 45*a* from second to-be-corrected object specifying table 45 and writes it as new second to-be-corrected object reception command data 54 into RAM 50C for updating purposes (step H18). Referring to FIGS. 25 and 26, for example, a day nearest and after execution date 54*a* "January 3, 2:00 a.m." among the execution days 45*a* is "every Sunday". If the execution date 54*a* is Wednesday, new execution date 54*a* is determined as "May 3, 2:00 a.m.". Then, CPU 10 reopens monitoring whether the internal time data has arrived at new execution date 54*a* without terminating the P signal reference correction process.

As described above, according to timepiece 3 of the present embodiment, only a part of the internal time data predetermined on second to-be-corrected object specifying table 45 is corrected based on a corresponding date predetermined on table 45. A required part of one frame of the time code corresponding to a time period ranging from detection of an M signal to counting the predetermined number of P signals in the time-code frame is received. Thus, the radio wave reception and the power consumption are greatly reduced compared with the prior art in which the whole frame of the time code is received.

Seventh Embodiment

Figure 28:
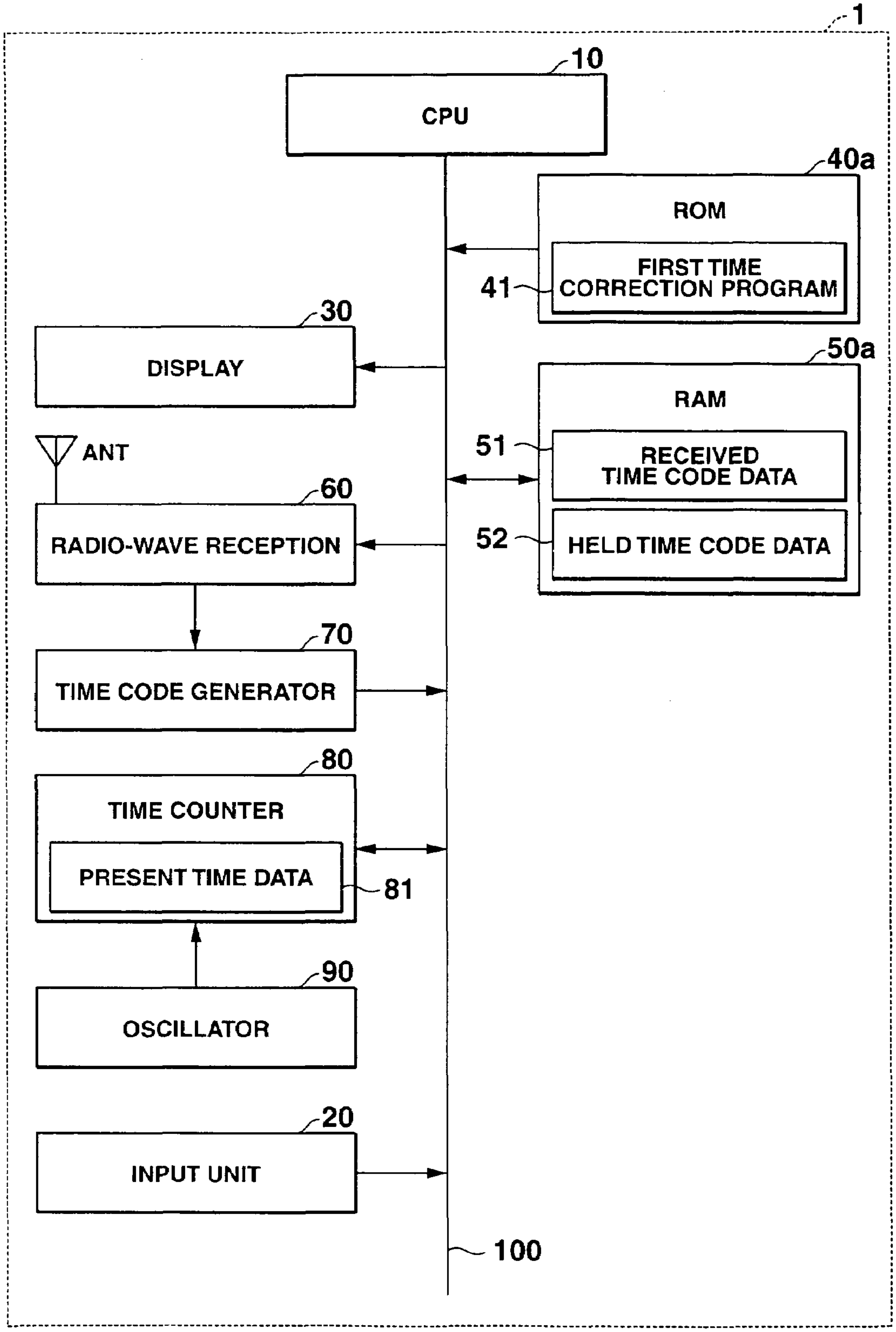
FIG. 28 is a block diagram of a radio-wave timepiece as a seventh embodiment of the invention.

FIG. 28 is a block diagram of a radio-wave timepiece 1 of the seventh embodiment.

The radio-wave timepiece 1 of the seventh embodiment is obtained by replacing ROM 40C and RAM 50C of the sixth embodiment of FIG. 7 with ROM 40*a* and RAM 50*a* of FIG. 28, respectively.

When a predetermined time, for example, of 2 o'clock a.m. or a predetermined time zone has come, CPU 10 starts to perform a first time correction process to be described later in detail, controls reception circuit 60 to receive the standard radio wave, and corrects present-time data 81 stored in RAM 50*a* counted by time counter 80 based on the standard time code received from time code generator 70. CPU 10 also outputs a display signal based on present-time data 81 to display 30, thereby updating the display time.

ROM 40*a* has stored various initial set values, initial programs, and other programs to perform various functions of timepiece 1, and data. It also has stored, especially, a first time correction program 41 to realize the corresponding process.

ROM 50*a* stores various programs to be executed by CPU 10, data involving execution of these programs, and has also stored reception time code data 51 and saved time code data 52 which are variables in the first time correction process.

These variables (hereinafter referred to as time code variables) in RAM 50*a* have the time code format of FIG. 1. As will be described later, in RAM 50*a* CPU 10 stores a standard time code outputted from time code generator 70 as received time code data 51, partially edits data 51 as required, or copies saved time code data 52 to RAM 50*a*.

A time part between nth and (n+1)th "seconds" in the time code variable will be referred hereinafter as an nth "second" location. A 0th "second" location where a head marker M, or an M signal, is present will be hereinafter referred to as an M signal location. In addition, 9th, 19th 29th, 39th, 49th and 59th "second" locations where P signals are present can be hereinafter referred to as P signal locations.

Radio-wave reception circuit 60 performs reception of the standard radio waves that includes picking up only a frequency signal corresponding to a standard radio wave from among radio waves received at an antenna ANT, converting this signal to another corresponding signal, and then outputting it to a time code generator 70. Time code generator 70 produces a standard time code in a format shown in FIG. 1 based on the signal from reception control unit 60, and then outputs it to CPU 10.

Time counter 80 counts clock pulses of a fixed frequency from oscillator 82, thereby holding present-time data 81, which is then outputted to CPU 10. Present-time data 81 is corrected by CPU 10 in a predetermined process.

A first time-correction process to be performed in the radio wave timepiece 1 will be described in detail with reference to a flowchart of FIG. 29. When the time indicated by present-time data 81 arrives at 2 o'clock a.m., CPU 10 of radio wave timepiece 1 reads first time-correction program 41 stored in ROM 40*a* and executes that program, thereby starting the first time-correction process of FIG. 29.

First, CPU 10 causes reception circuit 60 to receive the standard radio wave (step I11). Then, CPU 10 controls time code generator 70 so as to generate a standard time code, and then stores it as received time code data 51 in RAM 501 (step I13).

Next, CPU 10 searches the standard time code 51 for any lacks (step I15). Then, CPU 10 determines whether the lacks are only at the locations of the P signals in received time code data 51 (step I17).

When CPU 10 determines that there are no lacks in the P signal locations at step I17, CPU 10 further determines whether the standard radio wave has any lack in other signals excluding the P signals. If so (No in step 117), CPU 10 further determines whether any lacks were detected in 0th-to-49th-second locations of the standard radio wave (step I19).

If not (No in step I19), CPU 10 further determines whether any lacks were detected in 50th-59th-second locations of code data 51 (step I21).

If not (No in step I21), CPU 10 corrects present-time data 81 using received time code data 51, thereby terminating this process (step I39). This process was performed when there were no lacks in the standard time code generated based on the standard radio wave received at step I11. In this case, CPU 10 corrects preset-time data 81 using received time code data 51 of the same content as the generated standard time code.

When in step I21 CPU 10 detects that lack of time code element data in 50th-59th "second" locations of received time code data 51 (Yes in step I21), CPU 10 fills up the lack with appropriate time code element data in 20th-49th "second" locations of time code data 51 (step I27). More specifically, CPU 10 obtains a day of the week using values indicative of the day of the present year and the present year stored in 20th-49th "second" locations where no data are lacking. Then, the time code is edited such that the lack in the 50th-59th "second" locations is filled up with a value, which is one of 0-6, indicative of the day of the week thus obtained.

Then, CPU 10 corrects present-time data 81 using this edited received time code data 51, thereby terminating this process (step I39). That is, even when the code element of the standard time code is lacking in the 50th-59th second locations, time correction is achieved normally without receiving the standard radio waves again.

When in step I17 CPU 10 determines that only a P signal is lacking at its original location in the time code data 51 (Yes in step I17), CPU 10 fills up the lack with data on another P signal in a location other than in the lack position (step I29). As shown in FIG. 1, the P signals are disposed at intervals of 10 seconds in time code data 51. Thus, the lack can be filled up with data on an adjacent complete P signal. For example, when a lack of a P signal P2 (see FIG. 1) is detected in a 19th "second" location, it can be filled up with data on a P signal P3 present in a 29th "second" location.

Then, CPU 10 corrects present-time data 81 using this complemented time code data 51, thereby terminating this process (139). That is, even when a P signal is lacking in its original location in the standard time code obtained from the received standard radio wave, time correction is normally achieved without receiving the radio wave again. Also, this applies similarly when time code element data in the 50th-59th "second" location of the standard time code are lacking.

When CPU 10 detects that a time code element is lacking in a 0th-49th second locations of time code data 51 (Yes in step I19), CPU 10 first determines whether the reception of the standard radio wave performed this time in step I11 was for the first time (step I31).

If so (Yes in step I31), CPU 10 copies received time code data 51 to a location for saved time code data 52, thereby saving the standard time code obtained this time (step I33), and then goes to step I11.

Then, CPU 10 again performs the first time correction process. That is, CPU 10 receives the standard radio wave again (step I11) and then performs time correction process (steps I13-I39) using the generated standard time code (steps I13-I39).

If in this case there is no lack in the generated standard time code, CPU 10 completes present-time data 81 with received time code data 51 having the same content as the generated standard time code. Even when there is a lack in the generated standard time code, time correction can be normally achieved without receiving a further standard radio wave when a P signal and a time code element in the 50th-59th second locations are lacking.

When CPU 10 detects that there is lack of a time code element in the 0th-49th second locations of the standard time code and hence of time code data 51, generated from the again received radio wave (steps I11-I15→ No in step I17→ Yes in step I19→ No in step I31), CPU 10 determines whether time code data 51 can be replaced with saved time code data 52 that comprises the standard time code data received first (step I35).

When, for example, two time code variables have no lacks of common code elements in corresponding 0th-49th second locations, they can be determined as replaceable with each other, and if not, they are determined as unreplaceable.

When received time code data 51 is replaceable with saved time code data 52 (Yes in step I35), CPU 10 replaces time code data 51 with saved time code data 52 (step I37). More specifically, CPU 10 specifies the location of a lack in received time code data 51 and then overwrites it with corresponding data part of saved time code data 52.

Then, CPU 10 corrects present-time data 81 with complemented data 51, thereby terminating this process (step I39).

Thus, even when there are lacks in 0th-49th locations in the standard time code obtained from the standard radio wave and the standard radio wave need be received again, normal time correction is achieved by receiving the radio wave a smaller number of times than in the prior art.

Thus, according to radio wave timepiece 1 of the present embodiment, the time and hence power consumption required for receiving the standard radio wave are greatly reduced.

<Modification>

While in the above embodiment when P signal data is found to be lacking in its location in the received time code the lack is illustrated as filled up with a normal P signal in another location, the present invention is not limited to this particular case. For example, when a lack of a P signal (for example, P1 in FIG. 1) in its (for example, 9th second) location is detected, it may be filled up with an M signal disposed at the head location of the received time code.

Eighth Embodiment

Figure 30:
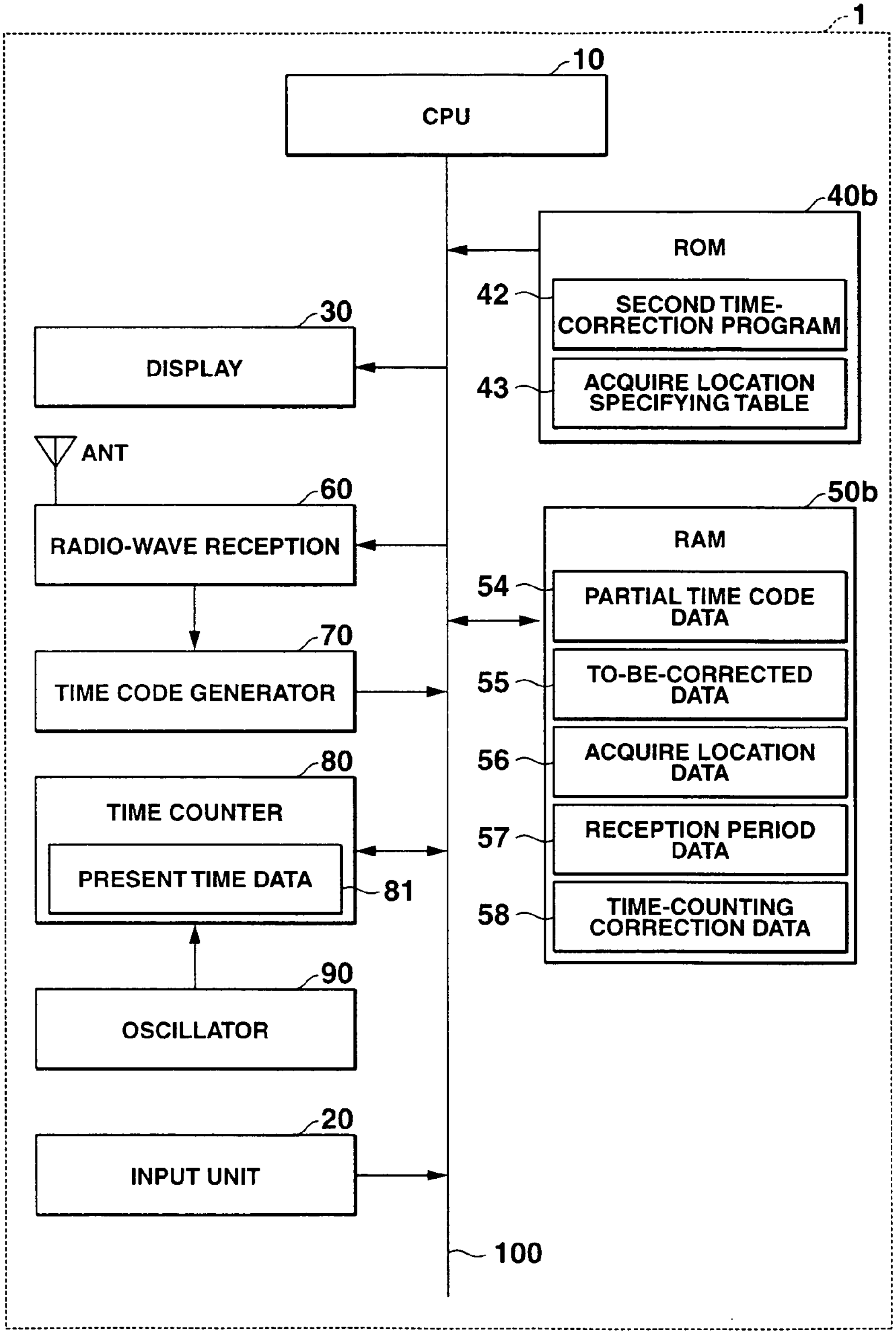
FIG. 30 is a block diagram of a radio-wave timepiece as an eighth embodiment of the invention.

FIG. 30 is a block diagram of a radio-wave timepiece 2 of the eighth embodiment. As shown in FIG. 30, timepiece 2 is obtained by replacing ROM 40*a* and RAM 50*a* of the seventh embodiment with ROM 40*b* and RAM 50*b*, respectively. Time counter 80 of timepiece 2 has the same structure as that of the seventh embodiment and counts time in present-time data 81, which will be described below in more detail.

Figures 31, 32:
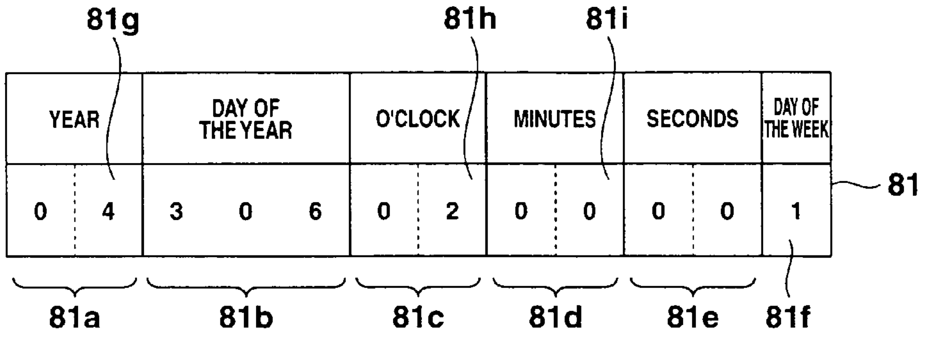
FIG. 31 illustrates the structure of present-time data.
FIG. 32 shows an acquire-location specifying table.

FIG. 31 schematically illustrates the content of present-time data 81 saved by time counter 80. As shown in FIG. 31, present-time data 81 comprises calendar year data 81*a* (represented by the last two digits of the present year in AD), day-of-the-year data 81*b*, o'clock data 81*c*, minute data 81*d*, second data 81*e*, and day-of-the-week data 81*f* (represented by a respective one of 0-6) stored in a BCD notation. For example, FIG. 31 illustrates Nov. 1, 2004, Monday, "2 (o'clock):00 (minutes):00 (seconds)" indicated in a decimal notation for simplifying purposes. Reference characters 81*g*, 81*h* and 81*j* denote the unit digits of year, o'clock, and minute data 81*a*, 81*c* and 811*d*, respectively.

ROM 40*b*, similar to ROM 40*a*, has stored programs and data, especially a second time-correction program 42 and an acquire-location specifying table 43 that will be described later in more detail.

As shown in FIG. 32, acquire-location specifying table 43 comprises execution day data indicative of a day when data correction is to be corrected, to-be-corrected data indicative of part of present-time data 81 to be corrected, and acquire location data representing a location in the standard time code where data to be corrected should be acquired. Each of the acquire-location data should include a P-signal location.

RAM 50*b*, similar to RAM 40*a*, stores various programs and data involving the execution of the respective programs, and especially partial time code data 54, to-be-corrected data 55, acquire-location data 56, reception period data 57 and time-counting correction data 58 that are variables in the second time correction process.

Partial time code data 54 is a part of the time code produced by receiving the standard radio wave in the second time correction process, and is also a time code variable like received time code data 51.

To-be-corrected data 55, shown in the acquired-location specifying table of FIG. 32, is a variable representing part of present-time data 81 to be corrected in the second time correction process. Acquire-location data 56, as shown in FIG. 32, represents a location where the to-be-corrected code data is to be acquired in the standard time code.

Reception period data 57 represents a period delimited by reception start and end times for which period the standard radio wave should be received. Time counting correction data 58 is used to overwrite present-time data 81.

<Operation>

Figure 33:
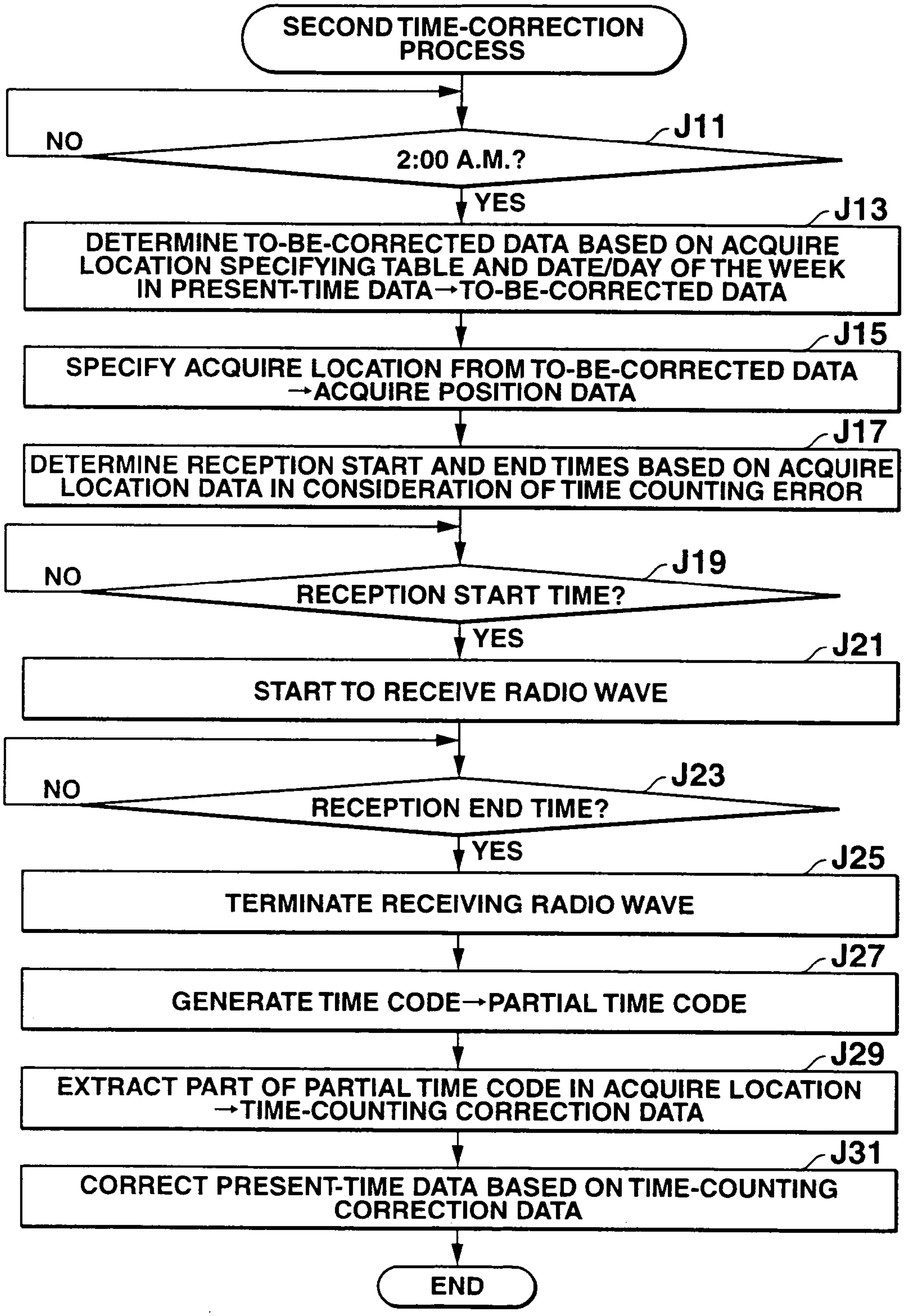
FIG. 33 is a flowchart of a second time correction process.

A time correction process that corrects the time indicated by radio wave timepiece 2 will be described with reference to flowchart of FIG. 33.

CPU 10 performs time correction program 42 stored in ROM 40*b*, thereby starting the time correction. CPU 10 waits until the time counted in present-time data 81 arrives at 2:00 a.m. (Yes in step J11), at which time CPU 10 determines part of present-time data 81 to be corrected based on acquire-location specifying table 43 and the present date and day of the week of present-time data 81, and then stores it as to-be-corrected data 55 in RAM 50*b* (step J13).

In this case, CPU 10 first obtains the present date and the present day of the week from day-of-the year data 81*b* and day-of-the week data 81*f*, respectively, of present-time data 81. CPU 10 then specifies to-be-corrected data corresponding to the obtained present date and day of the week on table 43, and then stores these data as to-be-corrected data 55. For example, with November, 1 (Monday) shown in FIG. 31, CPU 10 stores in RAM 50*b* data on the unit digit of o'clock for a "first day of each month" in the "execution day" column of FIG. 32 as to-be-corrected data 55.

Then, CPU 10 specifies an acquire-location corresponding to the to-be-corrected data on acquire-location specifying table 43, and then stores it as acquire-location data 56 (step B15). For example, if to-be-corrected data 55 is the unit digit of "o'clock", corresponding "15th-19th second locations are stored as acquire-location data 56.

Then, CPU 10 determines times when the reception of the standard radio wave starts and ends based on the acquire-location data 56 by allowing for a time counting error concerned, and then stores data on a reception period 57 delimited by the start and end times (step J17).

In this case, CPU 10 calculates an error time involving the internal time of timepiece 2 in this time correction process based on an error time per month determined from the specifications of time counter 80 and oscillator 82, and a time elapsed since the previous time correction. For example, when one day has elapsed since the previous time correction with a time error within ±30 seconds per month, the error time involving the present internal time is calculated as 1 second. That is, the time represented by present-time data 81 is a maximum of 1 second fast or slow compared with the correct time.

CPU 10 then determines the times when the reception of the standard radio wave starts and ends based on acquire-location data 56 by allowing for the error time. For example, when acquire-location data 56 is between 15th and 19th seconds and the error time is 1 second, CPU 10 determines that the reception of the standard radio waves should start at 2:0:14 a.m. and end at 2:00:20 a.m. such that part of the time code data in the 15th-19th second locations on the standard radio wave for 2:00 a.m. can be acquired.

Then, CPU 10 waits until the time when the reception of reception period data 57 starts (Yes in step J19), at which time CPU 10 starts to receive the standard radio wave (step J21). CPU 10 then continues to receive the radio wave until the time when the reception of data 57 ends (Yes in step J23), at which time CPU 10 then terminates the reception of the standard radio wave (step J25). That is, the standard radio waves are received, for example, for 6 seconds from 2:00:14 a.m. to 2:00:20 a.m.

Then, CPU 10 generates a standard time code from the received standard radio wave and then stores it as partial time code data 54 in RAM 54 (step J27). The partial time code data 54 comprises the time code data in 14th-19th second locations on the standard time code. In this respect, the time represented by present-time data 81 is one second fast compared with the standard time.

In this case, CPU 10 can recognize that partial time code data 54 is data in 14th-19th second locations by considering the fact that the P signal is in the 19th second location.

Then, CPU 10 extracts acquire-location data 56 of partial time code data 54 stored in RAM 50*b* and then stores it as time counting correction data 58 in RAM 50*b* (step J29). For example, a numeral "2" indicative of unit digit of o'clock data in 14th-19th second locations of time code data 54 stored in RAM 50*b* is extracted and then stored as time-counting correction data 58 in RAM 50*b*.

Then, CPU 10 corrects present-time data 81 based on time-counting correction data 58 and then terminates this process (step J31). More particularly, in this case CPU 10 overwrites to-be-corrected data 55 of present-time data 81 stored in RAM 50*b* with time-counting correction data 58. For example, CPU 10 overwrites a unit digit of o'clock part 81*h* of present-time data 81 with "2" that is time-counting correction data 58.

As described above, in accordance with this process and hence timepiece 2 of the present embodiment, the standard radio wave is received in a very short time such as 6 seconds compared with the period of the time code, the time is corrected based on the received standard radio wave, and power consumption is reduced.

Advantages Produced by the Embodiments

In one embodiment, a time information receiver (for example, radio wave timepiece 1 in FIG. 28) comprises:

counting means (for example, time counter 80 in FIG. 28) for counting time;

receiving means (for example, radio wave reception circuit 60 in FIG. 28; step I11 in FIG. 29) for receiving a standard radio wave;

first controlling means (for example, CPU 10 in FIG. 28; step I13 in FIG. 29) for controlling the receiving means to receive the standard radio wave, thereby acquiring a time code from the radio wave;

detecting means (for example, CPU 10 in FIG. 28; steps I15, I19 in step of FIG. 29) for detecting a lack of o'clock and minute data included in the time code acquired under control of the first controlling means;

second controlling means (for example, CPU 10 in FIG. 28; steps I19, I31, I33, I35, I37 in step of FIG. 29), responsive to the detecting means detecting the lack of o'clock and minute data included in the time code, for controlling the receiving means to receive the standard radio wave again, thereby acquiring a new time code from the radio wave, and for filling up the lack of o'clock and minute data in the time code acquired under control of the first controlling means based on the acquired new time code; and correcting means (for example, CPU 10 in FIG. 28; step I39 of FIG. 29) for correcting the time being counted by the time counting means with the filled up time code.

According to the present embodiment, the standard radio wave is received, and thereby the time code is acquired from the radio wave. When a lack of the o'clock and minute data included in the time code element data is detected, the standard radio wave is received again, and then a new time code is acquired. Then, the lack of the o'clock and minute is filled up based on the first-mentioned and new time code data. The time being counted by the time counting means is then corrected with the time code whose lack was filled up.

Thus, when a lack of the o'clock and minute data included in the acquired time code data is detected, the standard radio wave need be received only once more to correct the time being counted by the time counting means. Accordingly, a time information apparatus is provided in which the time required for receiving the standard radio wave and its power consumption are minimized.

In one embodiment, a time information receiver (for example, radio wave timepiece 1 in FIG. 28) comprises:

counting means (for example, time counter 80 in FIG. 29) for counting time which has a part involving a day of the week;

receiving means (for example, radio wave reception circuit 60 in FIG. 28; step I11 in FIG. 29) for receiving a standard radio wave;

controlling means (for example, CPU 10 in FIG. 28; step I13 in FIG. 29) for controlling the receiving means to receive the standard radio wave, thereby acquiring a time code from the radio wave;

detecting means (for example, CPU 10 in FIG. 28; steps I15, I21 in FIG. 29) for detecting a lack of day of the week data included in the acquired time code;

filling-up means (for example, CPU 10 in FIG. 28; steps I21, I27 in FIG. 29), responsive to the detecting means detecting the lack of day of the week data, for filling up the lack of day of the week data based on year data and day of the year data included in the acquired time code; and correcting means (for example, CPU 10 in FIG. 28; step I39 in FIG. 29) for correcting the time being counted by the time counting means with the time code whose lack of day of the week data was filled up by the filling-up means.

According to the present embodiment, the standard radio wave is received, and the time code is thereby acquired from the radio wave. When a lack of the day of the week data included in the time code element data is detected, the lack is filled up based on the year and day of the year data included in the time code. The time being counted by the time counting means is then corrected with the time code whose lack was filled up.

Thus, when such lack is detected, the time being counted by the time counting means can be corrected without receiving the standard radio wave again. Accordingly, a time information apparatus is provided in which the time required for receiving the standard radio wave and its power consumption are minimized.

In one embodiment, a time information receiver (for example, radio wave timepiece 1 in FIG. 28) comprises:

counting means (for example, time counter 80 in FIG. 29) for counting time;

receiving means (for example, radio wave reception circuit 60 in FIG. 28; step I11 in FIG. 29) for receiving a standard radio wave;

controlling means (for example, CPU 10 in FIG. 28; step I13 in FIG. 29) for controlling the receiving means to receive the standard radio wave, thereby acquiring a time code from the radio wave;

detecting means (for example, CPU 10 in FIG. 28; steps I15, I17 in FIG. 29) for detecting a lack of a particular one of a plurality of identification data disposed at predetermined intervals of time in the acquired time code according to a standard of the standard radio wave;

filling-up means (for example, CPU 10 in FIG. 28; step I29 in step of FIG. 29), responsive to the detecting means detecting the lack of the particular item of identification data, for filling up the lack of the particular item of identification data based on another one of the plurality of items of identification data and the predetermined intervals of time included in the acquired time code; and correcting means (for example, CPU 10 in FIG. 28; step I39 in FIG. 29) for correcting the time being counted by the time counting means with the time code whose lack of the particular item of identification data was filled up by the filling-up means.

According to the present invention, the standard radio wave is received, and thereby the time code is acquired from the radio wave. When a lack of a particular one of a plurality of items of identification data inserted at predetermined intervals of time in the acquired time code according to the standard of the standard radio wave is detected, the lack is filled up based on the other items of identification data and the predetermined intervals of time included in the acquired time code. The time being counted by the time counting means is then corrected with the time code whose lack is filled up.

Thus, when such lack is detected, the time being counted by the time counting means can be corrected without receiving the standard radio wave again. Accordingly, a time information apparatus is provided in which the time required for receiving the standard radio wave and its power consumption are minimized.

Figure 29:
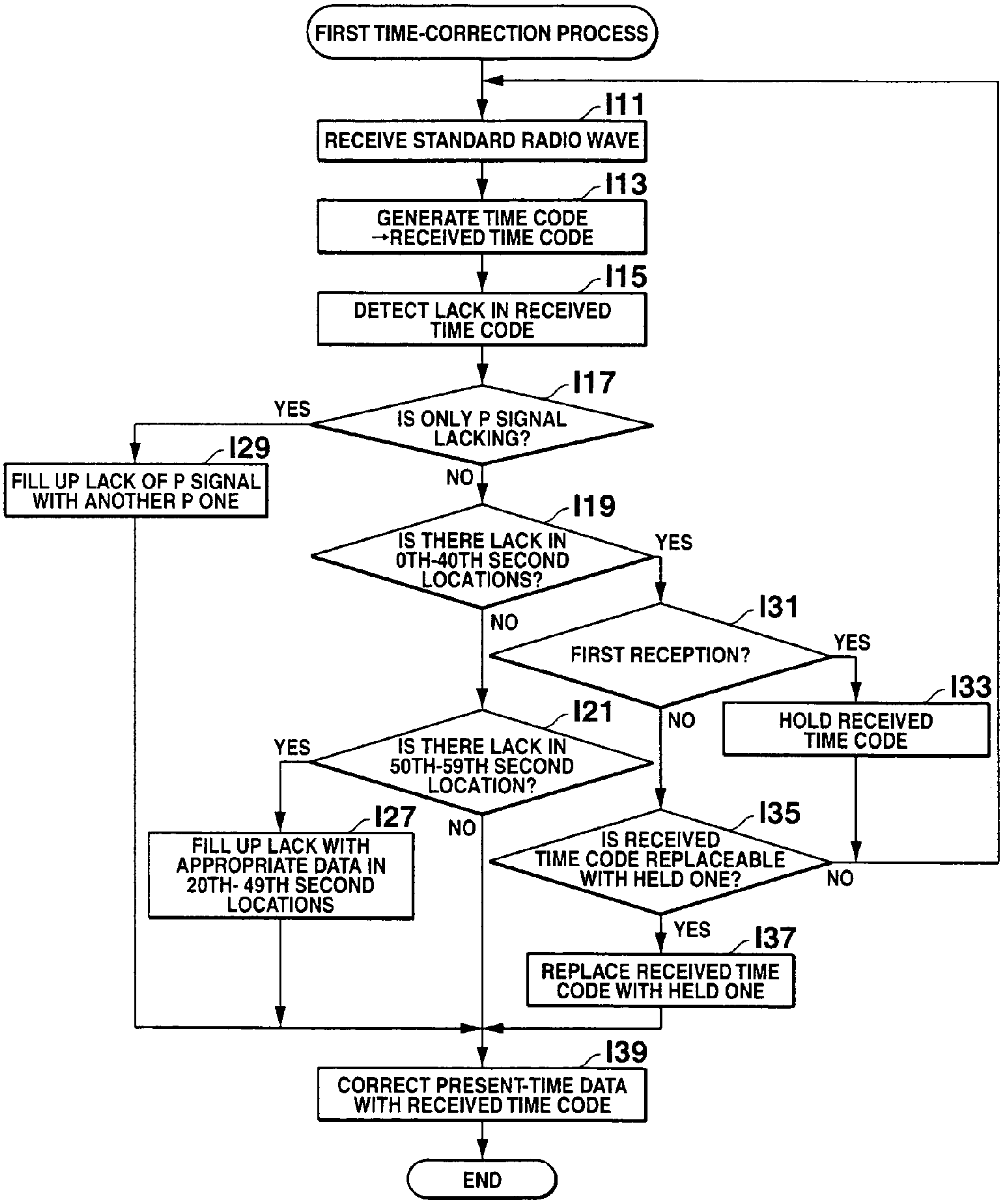
FIG. 29 is a flowchart of a first time correction process to be performed by the seventh embodiment.

In one embodiment, a time information receiver (for example, radio wave timepiece 1 in FIG. 28) comprises:

counting means for counting time (for example, time counter 80 in FIG. 28);

receiving means for receiving a standard radio wave (radio wave reception circuit 60 in FIG. 28; step I11 in FIG. 29);

controlling means (for example, CPU 10 in FIG. 28; step I13 in FIG. 29) for controlling the receiving means to receive the standard radio wave, thereby acquiring a time code from the radio wave;

detecting means (for example, CPU 10 in FIG. 28; steps I15, I17 of FIG. 29) for detecting a lack of a particular one of a plurality of items of identification data inserted at predetermined intervals of time according to a standard of the standard radio wave in the acquired time code, the particular item of identification being adjacent to head data of the time code;

filling-up means, responsive to the detecting means detecting the lack of the particular item of identification data, for filling up the lack of the particular item of identification data based on head data of the time code; and correcting means (for example, CPU 10 in FIG. 28; step I39 in FIG. 29) for correcting the time being counted by the time counting means with the time code whose lack of the particular item of identification was filled by the filling-up means.

According to the present embodiment, the standard radio wave is received, and thereby the time code is acquired from the radio wave. When a lack of a particular one of a plurality of items of identification data inserted at predetermined intervals of time in the acquired time code according to the standard of the standard radio wave is detected, the particular item of identification data being adjacent to the head data of the time code, the lack is filled up based on the head data of the time code. The time being counted by the time counting means is then corrected with the time code whose lack is filled up. The time being counted by the time counting means is then corrected with the time code whose lack was filled up.

Thus, when such lack is detected, the lack can be filled up and the time being counted by the time counting means can then be corrected without receiving the standard radio wave again. Accordingly, a time information apparatus is provided in which the time required for receiving the standard radio wave and its power consumption are minimized.

In one embodiment, a time information receiver comprises:

counting means (time counter 80 in FIG. 28) for counting time which has a part involving o'clock, minutes and seconds;

receiving means (radio-wave reception circuit 60 in FIG. 28) for receiving a standard radio wave including a time code, thereby acquiring the time code;

detecting means (CPU 10 in FIG. 28; steps I15, I17 in FIG. 29) for detecting a lack of a particular one of a plurality of items of identification data disposed in the acquired time code according to a standard of the standard radio wave, the particular item of identification data being adjacent to head data of the time code;

filling-up means (CPU 10 in FIG. 28; step I29 in FIG. 29), responsive to the detecting means detecting the lack of the particular item of identification data, for filling up the lack of the particular item of identification data with corresponding head data part of a time code acquired beforehand by the receiving means; and correcting means (CPU 10 in FIG. 28; step I39 in FIG. 29) for correcting the time being counted by the counting means based on the time code whose lack of the particular item of identification data was filled up by the filling-up means.

According to the present embodiment, when a lack of a particular one of a plurality of items of identification data disposed in the acquired time code according to the standard of the standard radio wave is detected, the particular item of identification data being adjacent to head data of the time code, the lack is filled up with part of a time code acquired beforehand by the acquiring means corresponding to the head data of the time code. Then, the time being counted by the time counting means is corrected rapidly and securely based on the time code whose lack was filled up. Accordingly, a time information apparatus is provided in which the time required for receiving the standard radio wave and its power consumption are minimized.

Various modifications and changes may be made thereto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

What is claimed is:

1. A time information receiver comprising:

counting means for counting time;

receiving means for receiving a standard radio wave;

first controlling means for controlling the receiving means to receive the standard radio wave, thereby acquiring a time code from the radio wave;

detecting means for detecting a lack of o'clock and minute data included in the time code acquired under control of the first controlling means;

second controlling means, responsive to the detecting means detecting the lack of o'clock and minute data included in the time code, for controlling the receiving means to receive the standard radio wave again, thereby acquiring a new time code from the radio wave, and for filling up the lack of o'clock and minute data in the time code acquired under control of the first controlling means based on the acquired new time code; and correcting means for correcting the time being counted by the time counting means with the filled up time code.

2. A time information receiver comprising:

counting means for counting time which has a part involving a day of the week;

receiving means for receiving a standard radio wave;

controlling means for controlling the receiving means to receive the standard radio wave, thereby acquiring a time code from the radio wave;

detecting means for detecting a lack of day of the week data included in the acquired time code;

filling-up means, responsive to the detecting means detecting the lack of day of the week data, for filling up the lack of day of the week data based on year data and day of the year data included in the acquired time code; and correcting means for correcting the time being counted by the time counting means with the time code whose lack of day of the week data was filled up by the filling-up means.

3. A time information receiver comprising:

counting means for counting time;

receiving means for receiving a standard radio wave;

controlling means for controlling the receiving means to receive the standard radio wave, thereby acquiring a time code from the radio wave;

detecting means for detecting a lack of a particular one of a plurality of items of identification data disposed at predetermined intervals of time in the acquired time code according to a standard of the standard radio wave;

filling-up means, responsive to the detecting means detecting the lack of the particular item of identification data, for filling up the lack of the particular item of identification data based on another one of the plurality of items of identification data and the predetermined intervals of time included in the acquired time code; and correcting means for correcting the time being counted by the time counting means with the time code whose lack of the particular item of identification data was filled up by the filling-up means.

4. A time information receiver comprising:

counting means for counting time;

receiving means for receiving a standard radio wave;

controlling means for controlling the receiving means to receive the standard radio wave, thereby acquiring a time code from the radio wave;

detecting means for detecting a lack of a particular one of a plurality of items of identification data inserted at predetermined intervals of time according to a standard of the standard radio wave in the acquired time code, the particular item of identification being adjacent to head data of the time code;

filling-up means, responsive to the detecting means detecting the lack of the particular item of identification data, for filling up the lack of the particular item of identification data based on head data of the time code; and correcting means for correcting the time being counted by the time counting means with the time code whose lack of the particular item of identification was filled by the filling-up means.

5. A time information receiver comprising:

counting means for counting time which has a part involving o'clock, minutes and seconds;

receiving means for receiving a standard radio wave including a time code, thereby acquiring the time code;

detecting means for detecting a lack of a particular one of a plurality of items of identification data disposed in the acquired time code according to a standard of the standard radio wave, the particular item of identification data being adjacent to head data of the time code;

filling-up means, responsive to the detecting means detecting the lack of the particular item of identification data, for filling up the lack of the particular item of identification data with a corresponding head data part of a time code acquired beforehand by the receiving means; and correcting means for correcting the time being counted by the counting means based on the time code whose lack of the particular item of identification data was filled up by the filling-up means.

* * * * *